United States Patent
Zheng

(10) Patent No.: US 8,351,792 B2
(45) Date of Patent: Jan. 8, 2013

(54) SYSTEM AND COMMUNICATION METHOD FOR INTERCONNECTING OPTICAL NETWORK AND RADIO COMMUNICATION NETWORK

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1215 days.

(21) Appl. No.: 12/142,595

(22) Filed: Jun. 19, 2008

(65) Prior Publication Data
US 2008/0253773 A1    Oct. 16, 2008

Related U.S. Application Data

(63) Continuation of application No. PCT/CN2006/003209, filed on Nov. 29, 2006.

(30) Foreign Application Priority Data

Dec. 19, 2005   (CN) .......................... 2005 1 0136853

(51) Int. Cl.
*H04B 10/00* (2006.01)
(52) U.S. Cl. .............. 398/115; 398/72; 398/71; 398/68; 398/66; 398/67; 398/76; 398/100; 398/116; 370/401; 370/328; 370/338; 370/389; 370/352; 725/105; 725/106; 725/125; 725/127; 725/129; 455/422; 455/524; 455/562; 455/443
(58) Field of Classification Search .................. 398/66, 398/67, 68, 69, 70, 71, 72, 74, 75, 76, 77, 398/78, 79, 59, 60, 98, 99, 100, 115, 135, 398/116; 370/401, 328, 338, 466, 342, 352, 370/392, 389, 465; 725/105, 106, 125, 127, 725/129; 455/422, 524, 562, 443
See application file for complete search history.

(56) References Cited

U.S. PATENT DOCUMENTS

| 6,804,465 | B2 | 10/2004 | Volpi et al. |
| 6,807,270 | B2 | 10/2004 | Porter |
| 6,895,185 | B1 * | 5/2005 | Chung et al. ..................... 398/72 |
| 7,761,094 | B2 * | 7/2010 | Stein et al. .................. 455/426.1 |

(Continued)

FOREIGN PATENT DOCUMENTS

CN            1638504            7/2005

(Continued)

OTHER PUBLICATIONS

International Search Report for International Application No. PCT/CN2006/003209, dated Mar. 8, 2007, and English translation thereof.

(Continued)

*Primary Examiner* — Hanh Phan
(74) *Attorney, Agent, or Firm* — Slater & Matsil, L.L.P.

(57) ABSTRACT

A system and communication method for the system interconnecting the optical network with the radio communication network is provided. The solution mainly applies to an optical access network employing fiber for transmission and the radio communication network connected to the optical access network, wherein a base station of the radio communication network is connected to the optical access network and communicates to an entity in the optical access network to achieve interconnection between the optical network and the radio communication network. After the interconnection is established, a user equipment can enjoy communication services through the interconnected radio communication network and the optical network.

20 Claims, 36 Drawing Sheets

U.S. PATENT DOCUMENTS

| | | | |
|---|---|---|---|
| 2004/0004950 A1* | 1/2004 | Kim et al. | 370/338 |
| 2004/0264683 A1* | 12/2004 | Bye | 379/402 |
| 2005/0152695 A1 | 7/2005 | Sulzberger et al. | |
| 2005/0193309 A1* | 9/2005 | Grilli et al. | 714/752 |
| 2006/0045524 A1* | 3/2006 | Lee et al. | 398/71 |
| 2006/0045525 A1* | 3/2006 | Lee et al. | 398/71 |
| 2008/0260389 A1* | 10/2008 | Zheng | 398/115 |
| 2008/0298311 A1* | 12/2008 | Zha et al. | 370/328 |
| 2009/0003831 A1* | 1/2009 | Zheng | 398/115 |

FOREIGN PATENT DOCUMENTS

| | | |
|---|---|---|
| CN | 101160841 A | 4/2008 |
| EP | 1959614 A1 | 8/2008 |
| WO | 03/088518 A1 | 10/2003 |

OTHER PUBLICATIONS

"Transmission and Multiplexing (TM); Optical Access Networks (OANs) for evolving services; ATM Passive Optical Networks (PONs) and the transport of ATM over digital subscriber lines; TX 101 272"; ETSI Standards; LIS, Sophia Antipolis Cedex, France; vol. TM-3, No. V1.1.1; Jun. 1, 1998; XP014015940; ISSN: 0000-0001.

European Search Report for European Application No. 06828196.3, dated May 28, 2009.

Hong Xiaobin, et al.; "The Transmission of IP Datagrams in ATM PON"; Optical Communication Center, Beijing University of Posts and Telecommunications, Beijing; High Technology Letters; 2000; vol. 10, No. 3, p. 37-40; Jan. 20, 2009; http://10.1.10.3:90/~kjqk/gjstx98/gjst2000/0003/000310.htm; and English Abstract thereof; 5 pages.

Xiong Huaping, et al.; "GPON—New Generation Broadband Optical Access Network"; Radio Electronics Abstracts of China, Core Journal of Telecommunications Technologies; State Key Laboratory of Laser Technology in Huazhong University of Science and Technology, Wuhan, China; Optical Communication Technology; Issue 11; 2003; Nov. 30, 2003; and English translation thereof; 13 pages.

Chinese Office Action for Chinese Patent Application No. 2006800122093, dated Feb. 6, 2009, and partial English translation thereof.

Chinese Office Action for Chinese Patent Application No. 2006800122093, dated Aug. 7, 2009, and partial English translation thereof.

Chinese Office Action for Chinese Patent Application No. 2006800122093, dated Dec. 11, 2009, and partial English translation thereof.

European Communication for European Patent Application No. 06 828 196.3, dated Nov. 30, 2011.

* cited by examiner

SYSTEM AND COMMUNICATION METHOD FOR INTERCONNECTING OPTICAL NETWORK AND RADIO COMMUNICATION NETWORK

CROSS-REFERENCE TO RELATED APPLICATIONS

This application is a continuation of International Application No. PCT/CN2006/003209, filed Nov. 29, 2006. This application claims the benefit of Chinese Application No. 200510136853.9, filed Dec. 19, 2005. The disclosures of the above applications are incorporated herein by reference.

FIELD

The present disclosure relates to network communication technology, and particularly, to a technique that interconnects an optical access network and a radio communication network.

BACKGROUND

The statements in this section merely provide background information related to the present disclosure and may not constitute prior art.

Network communication systems commonly used at present include optical network communication system and radio communication system. The description of the two types of systems is provided as follows.

The optical network communication system includes optical access networks (generally called FTTx). FIG. 1 shows the network architecture of the FTTx, FIG. 2 shows reference architecture of an Optical Access Network (OAN) based on the network architecture in FIG. 1. An OAN as shown in FIG. 2 includes a Customer Premise Network (CPN), an Access Network (AN) and a Service Node Function (SNF).

The AN in the OAN includes an optional Adaptor Function (AF) adapted for conversion between an Optical Network Unit (ONU)/Optical Network Terminal (ONT) interface and a User Network Interface (UNI). When the AF is integrated into the ONU, the reference point (a) can be cancelled. The AF may also be installed behind an Optical Line Terminal (OLT) and adapted for conversion between the OLT interface and a Service Network Interface (SNI). In the optical network, the AF can be regarded either the function of the CPN or the function of the AN.

The major network elements of the CPN and AN in the OAN include: OLT, Optical Distribution Network (ODN), ONU or ONT and AF. The T is the reference point of the UNI and the V is the reference point of the SNI. The OLT provides network interface for the ODN and is connected to one or multiple ODNs. The ODN provides data transport for the OLT and the ONU. The ONU provides user side interface for the OAN and is connected to the ODN. A CPE is connected to the AF via the UNI (e.g., a Digital Subscriber Line DSL). The AF converts a packet from the UNI format into a format compatible with the (a) interface (e.g., Ethernet link) connected to the ONU. The ONU further converts the packet into a format compatible with ODN transmission (e.g., Ethernet Passive Optical Networks (EPON) packet, Gigabit Passive Optical Network (GPON) generic framing). Finally the OLT converts the packet into an SNI (e.g., Ethernet link) packet format and accesses the service node.

The radio communication system may include 3G or 2G radio communication system. The reference architecture of the 3G and 2G radio communication systems is shown in FIG. 3, mainly including a Radio Access Network (RAN) and a Core Network (CN), in which the RAN is adapted to provide all radio functions and the CN is adapted to process voice calls and data connections within the radio communication system and for interaction with and routing to external networks. In the radio communication network, the CN is divided logically into a Circuit Switched (CS) Domain and a Packet Switched (PS) Domain.

As shown in FIG. 3, the radio communication network includes the following function entities:

Base Station (BS): the BS is called Base Transceiver Station (BTS) in the Global System for Mobile communications (GSM), the General Packet Radio Service (GPRS), the Code Division Multiple Access (CDMA) and CDMA2000 systems, and is called Node B in the Wideband Code Division Multiple Access (WCDMA) and Time Division-Synchronous Code Division Multiple Access (TD-SCDMA) systems;

Base Station Controller (BSC): the BSC is called Radio Network Controller (RNC) in the WCDMA; and Packet Control Function (PCF) in the CDMA2000: the PCF is between the BSC and the Packet Data Serving Node (PDSN) and adapted to provide packet data service support; the PCF as a part in the radio access network can be integrated with the BSC or be a standalone device.

The component of the conventional radio communication system is described in detail with reference to a WCDMA system.

The UMTS Terrestrial Radio Access Network (UTRAN) of the WCDMA system employs the Iu series interfaces including Iu, Iur and Iub interfaces. Each of the interfaces consists of a Radio Network Layer (RNL) and a Transport Network Layer (TNL) according to the UTRAN interface general protocol model division protocol stack, in which:

the Iu interface is an open standard interface via which the UTRAN and the CN are connected, the control plane protocol of the Iu interface includes the Radio Access Network Application Part (RANAP) and the user plane protocol of the Iu interface is the General data Transport Protocol (GTP);

the Iur interface is a distinctive UMTS interface between RNCs and adapted for mobile management of the mobile stations in the RAN, e.g., when a mobile station switches from one RNC to another in a soft switching, the data of the mobile station is all transferred via the Iur interface from the working RNC to the candidate RNC; the Iur interface is also an open standard interface, the control plane protocol of the Iu interface is the Radio Network Subsystem Application Protocol (RNSAP) and the user plane protocol of the Iu interface is the Iur Frame Protocol (Iur FP);

the Iub interface is an open standard interface between the Node B and the RNC, the control plane protocol of the Iub interface includes the NBAP and the user plane protocol of the Iub interface is the Iub FP.

The Node B in the WCDMA system includes a radio transceiver and a baseband processing part. The Node B is connected to the RNC via a standard Iub interface and mainly adapted for physical layer protocol processing of the Uu interface. The major functions of the base station include spread spectrum, modulation, channel coding, despread spectrum, demodulation, channel decoding and the conversion between a baseband signal and a radio frequency signal.

The RNC in the WCDMA system is adapted to control radio resources of the UTRAN, including broadcast distribution and system admission control, mobility management such as switching and RNC relocation management, and radio resource management and control such as macro diversity combination, power control, and radio bearer allocation.

The radio interface protocol stack between the UE and UTRAN includes multiple protocols implemented in different nodes in the radio access network. The protocols are shown in FIG. 4, including:

Radio Resource Control (RRC) protocol, implemented in the UE and RNC and adapted for managing RRC connections and radio bearers, paging/broadcasting, mobility management, and configuring the parameters of other protocol entities in the radio interface protocol stack;

Radio Link Control (RLC) protocol, implemented in the UE and RNC and adapted for user data transport, and the RLC provides three data transport modes for transport service data with different QoS requirements;

Medium Access Control (MAC) protocol, usually implemented in the UE and RNC and adapted to select appropriate transport format for user data and map logic channel onto transport channel; also implemented in the Node B for some special channel types;

Packet Data Convergence Protocol (PDCP), implemented in the UE and RNC, adapted for compressing and decompressing headers of IP data traffics in transmitting and receiving entities respectively, e.g., for combinations of Transmission Control Protocol (TCP)/Internet Protocol (IP) or Real-Time Transport Protocol (RTP)/User Datagram Protocol (UDP)/IP header compression pattern and corresponding network layer transport layer or upper layer protocols; forwarding PDCP Service Data Units (SDU) from non-access stratum to the RLC layer while transmitting user data; and when lossless Serving Radio Network Subsystem (SRNS) relocation is supported, forwarding the PDCP-SDUs and corresponding serial numbers to multiplex multiple different radio bearers onto one RLC entity.

The Broadcast/Multicast Control (BMC) functions in the WCDMA system include: storing cell broadcast messages; monitoring service traffics and requesting radio resources for Cell Broadcast Service (CBS); dispatching BMC messages; sending BMC messages to a UE; and sending cell broadcast messages to a upper layer (e.g., Non Access Stratum (NAS)).

Because the Node B in the conventional protocol stack processes physical layer protocols only, the self-adaptive technique that makes judgment based on resource management needs to be implemented in the RNC, therefore the traffic from the radio communication network to a terminal has to travel in two phases: from the RNC to the Node B and from the Node B to the terminal, and the traffic from the terminal to the radio communication network travel also in two phases in a reversed order.

Such process inevitably leads to the following problems:

As the traffic needs to pass the Iub interface, a lag time of the process is longer, and therefore the processing capacity of the Node B and the statistical division multiplexing rate of resource transmission at the Iub interface are decreased.

The retransmission mechanism of the RLC layer between the RNC and the UE lowers the throughput rate of the radio communication network when the Iub interface shows large lag time.

The outer power control algorithm in the radio communication network is unable to adjust the target signal interface ratio (SIRtarget) according to the changes in the air interface when the Iub interface shows large lag time.

The cell load information in the radio communication network is reported by the Node B regularly, however, when the process described above occupies a large amount of the Iub interface resources, the cell load information cannot be reported in time and the RNC therefore will be unable to acquire accurate realtime cell load information.

Along with the rapid development of network communication technology, the network communication industry has begun to seek best data transmission performance on the basis of the merits of varieties of networks, however, the interconnection between the 3G or 2G radio communication network and the OAN has not been achieved in the conventional technology.

Furthermore, it can be seen easily from the description above that the protocol structure of the conventional radio communication network, in which all upper access stratums are arranged in the RNC, is unable to guarantee data transmission of high speed and high efficiency when self-adaptive adjustment and feedback control techniques are applied, hence the conventional protocol structure does not meet the demand for high-speed data transmission.

SUMMARY

Embodiments provide a system and communication method for interconnecting an optical network with a radio communication network, which provide a feasible technical scheme for interconnection of the optical network with the radio communication network so that service transport in communication networks can be implemented by fully utilizing the merits of the optical network and the radio communication network.

An system for interconnecting an optical network with a radio communication network includes a fiber transmission based optical access network and a radio communication network connected to the optical access network; a base station connection of the radio communication network being established in the optical access network and communicating with an entity of the optical access network for interconnection of the optical network with the radio communication network.

A communication method for a system that interconnects an optical network with a radio communication network includes:

on an uplink, sending a message from a user terminal in the radio communication network to a base station, forwarding the message from the base station to an entity in the optical access network and transmitting the message over the optical access network; and transmitting a message by a user terminal in an optical network via corresponding entity in the optical access network;

on a downlink, sending a message by the optical access network to the base station through corresponding entity and forwarding the message to the user terminal under the base station in the radio communication network; and sending the message by the optical access network to the user terminal in the optical network through corresponding entity.

Another communication method for a system that interconnects an optical network with a radio communication network includes:

on an uplink, sending a message from a user terminal in the radio communication network to a base station and forwarding the message to a core network by the base station through a reference point V in an optical access network; and send a message from a user terminal in an optical network to the core network through corresponding entity in the optical access network;

on a downlink, sending a message from the core network to the base station through the reference point V and forwarding the message to the user terminal under the base station in the radio communication network; and sending a message to the user terminal in the optical network through corresponding entity in the optical access network.

It can be seen from the technical scheme above that, in order to interconnect a radio communication network with an optical access network, a base station in the radio communication network is connected to the optical access network so that the interconnection of the networks is achieved through tightly or loosely coupled OAN; the radio communication network functions as the radio extension of the OAN cable access and is suitable for fixed radio, nomad, portable and mobile access application. A new evolution of developing radio network is thus provided for OAN operators.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 7A:
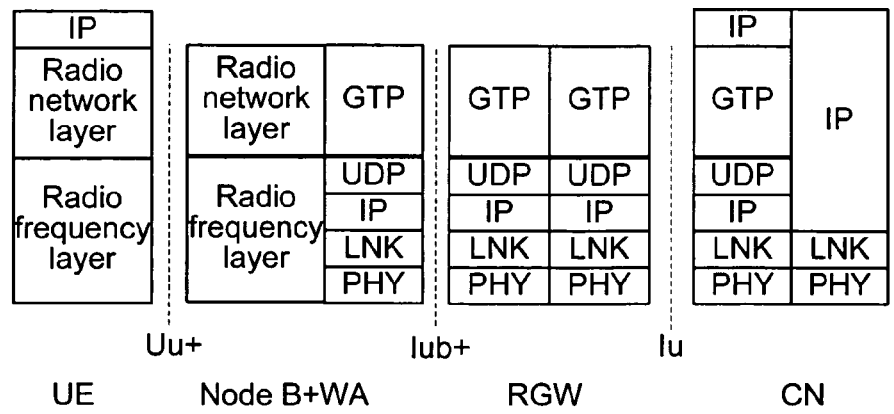
Figure 7B:
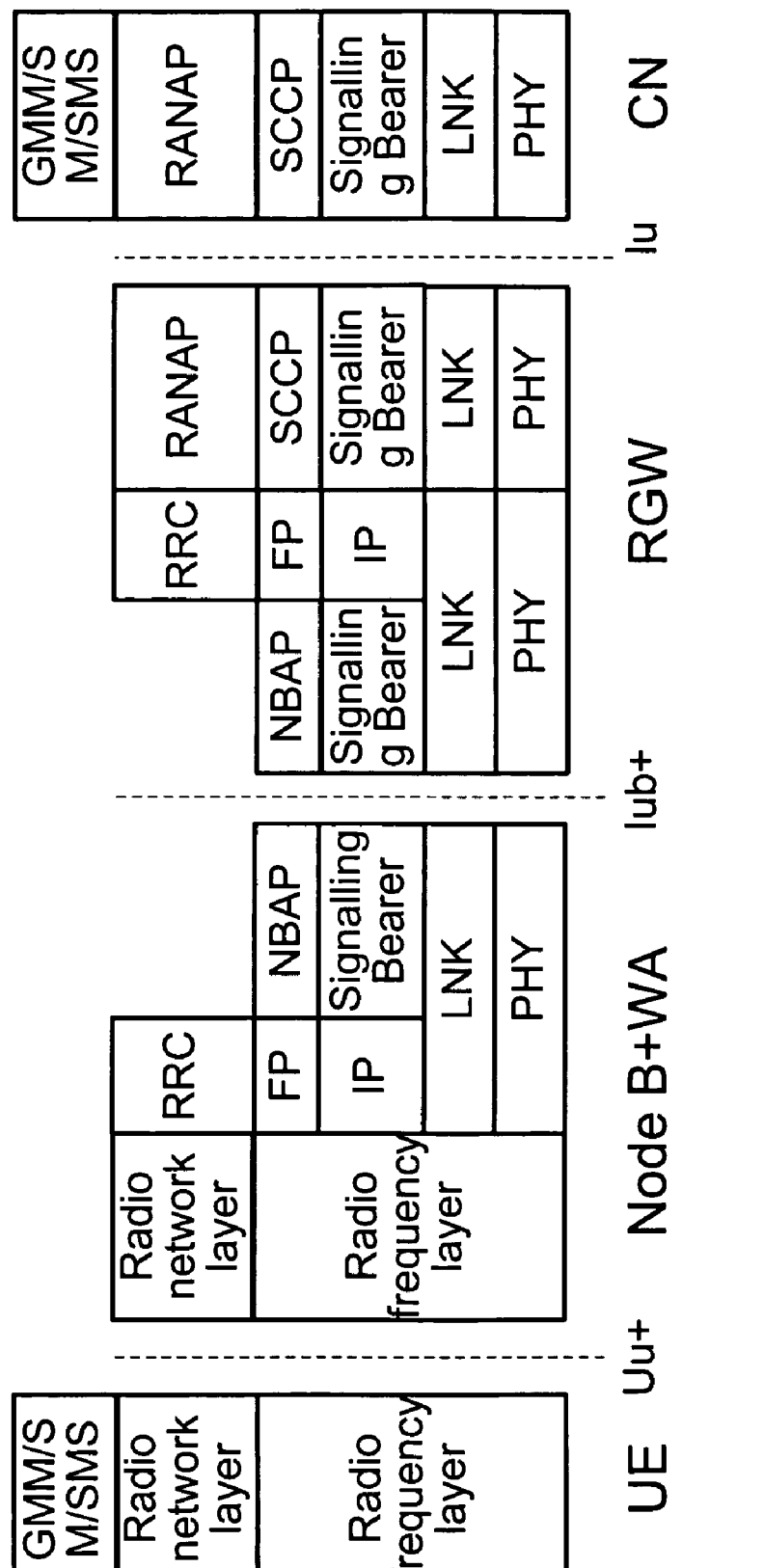
Figure 8:
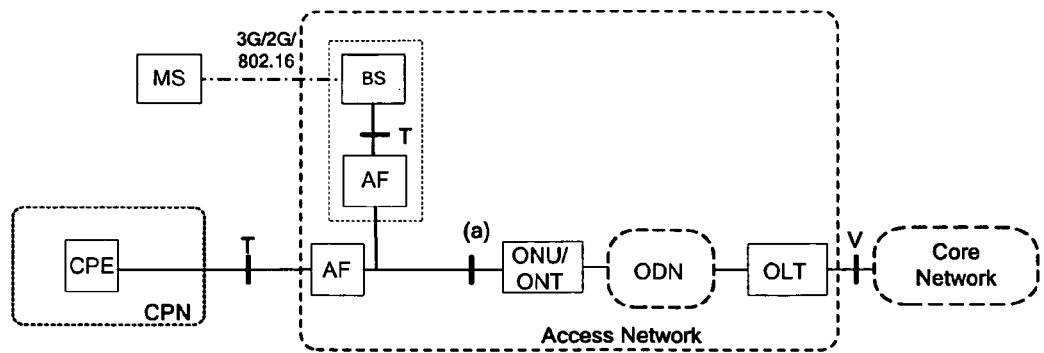
Figure 9:
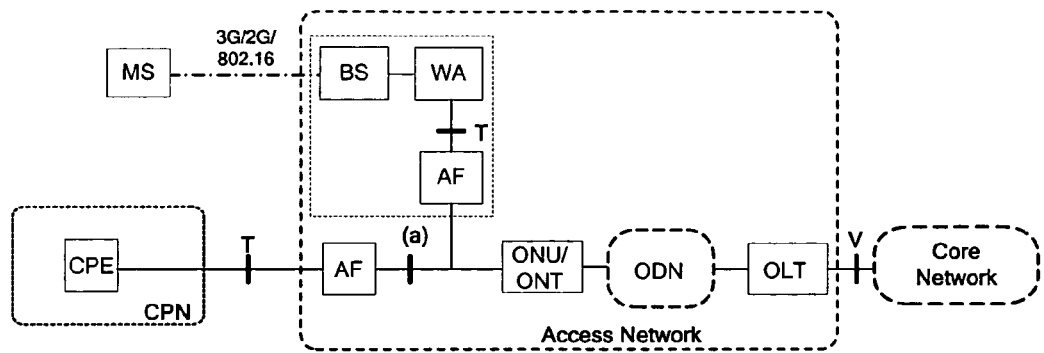
Figure 10:
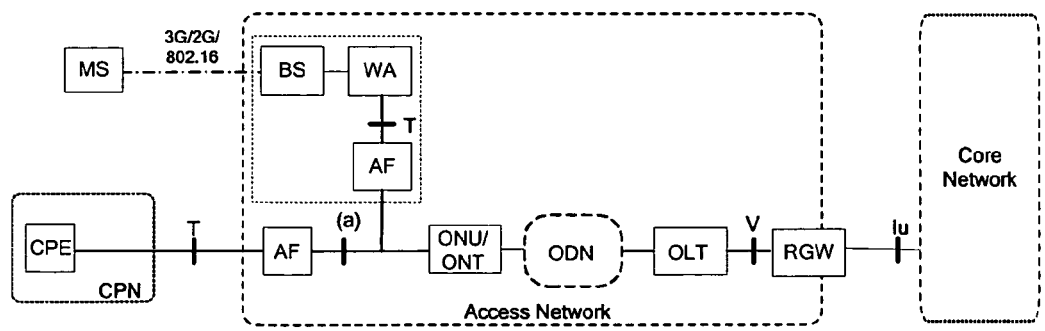
Figure 11:
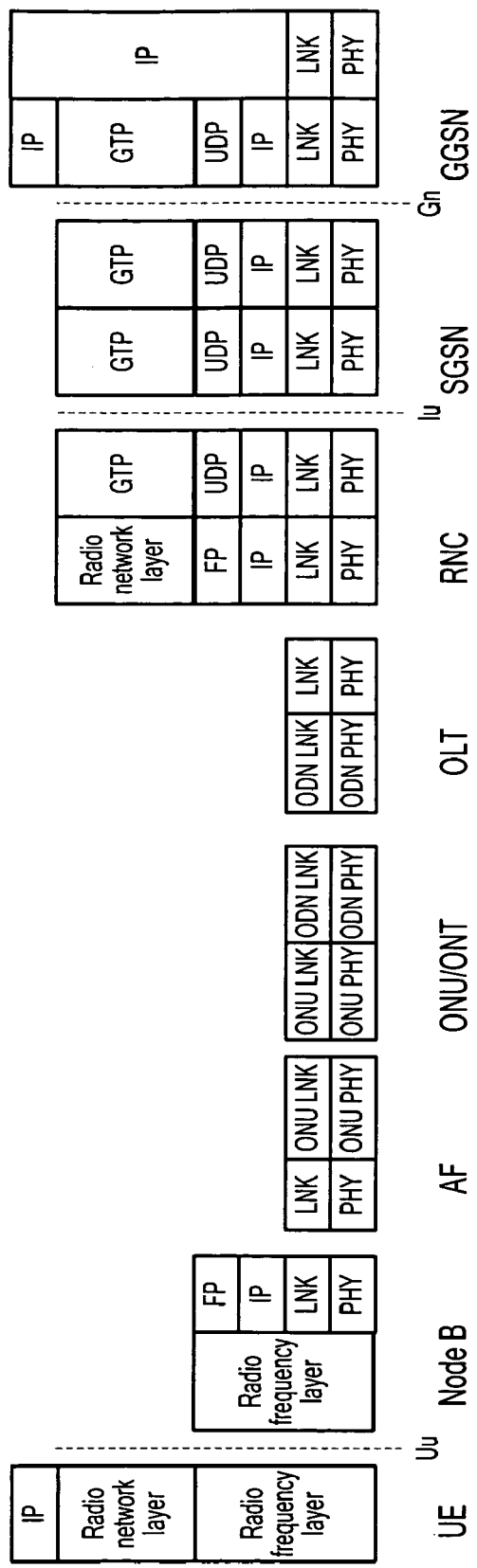
Figure 12:
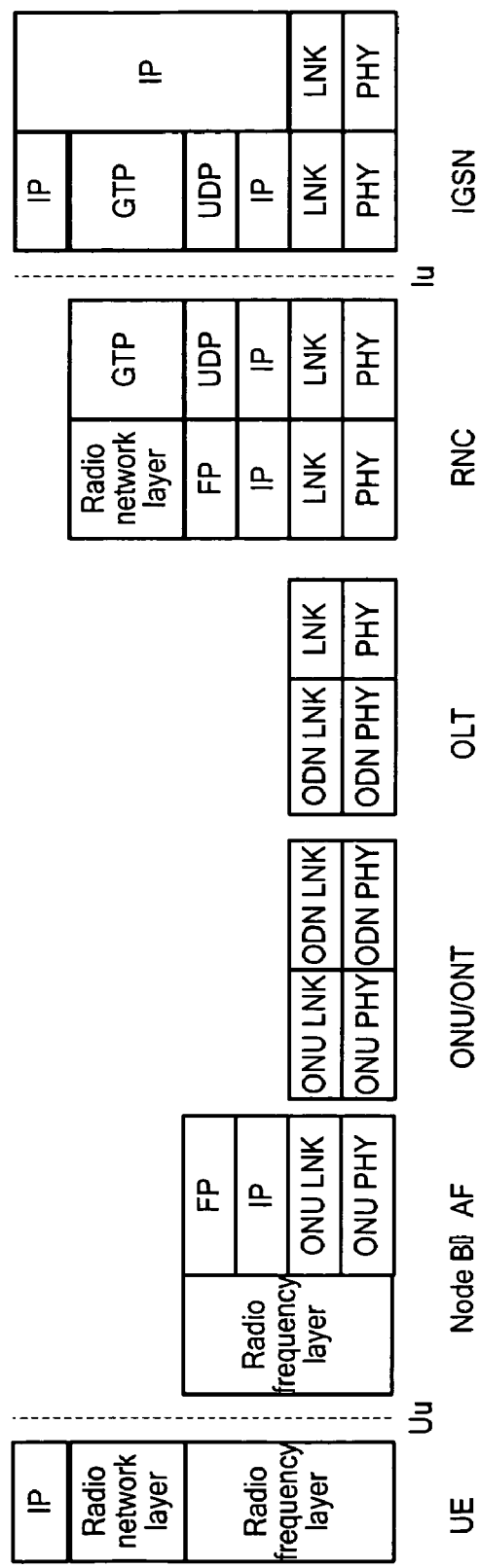
Figure 13:
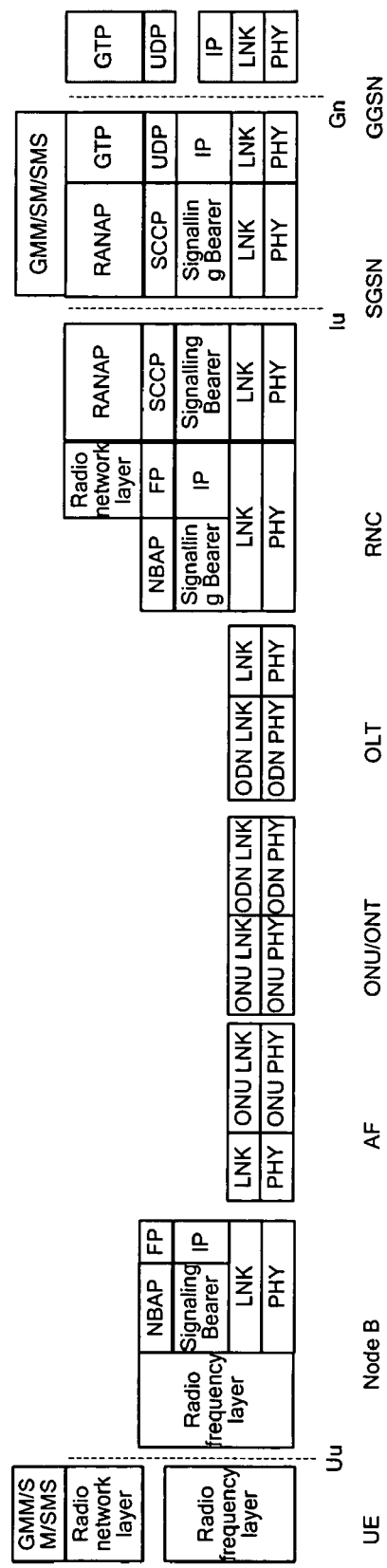
Figure 14:
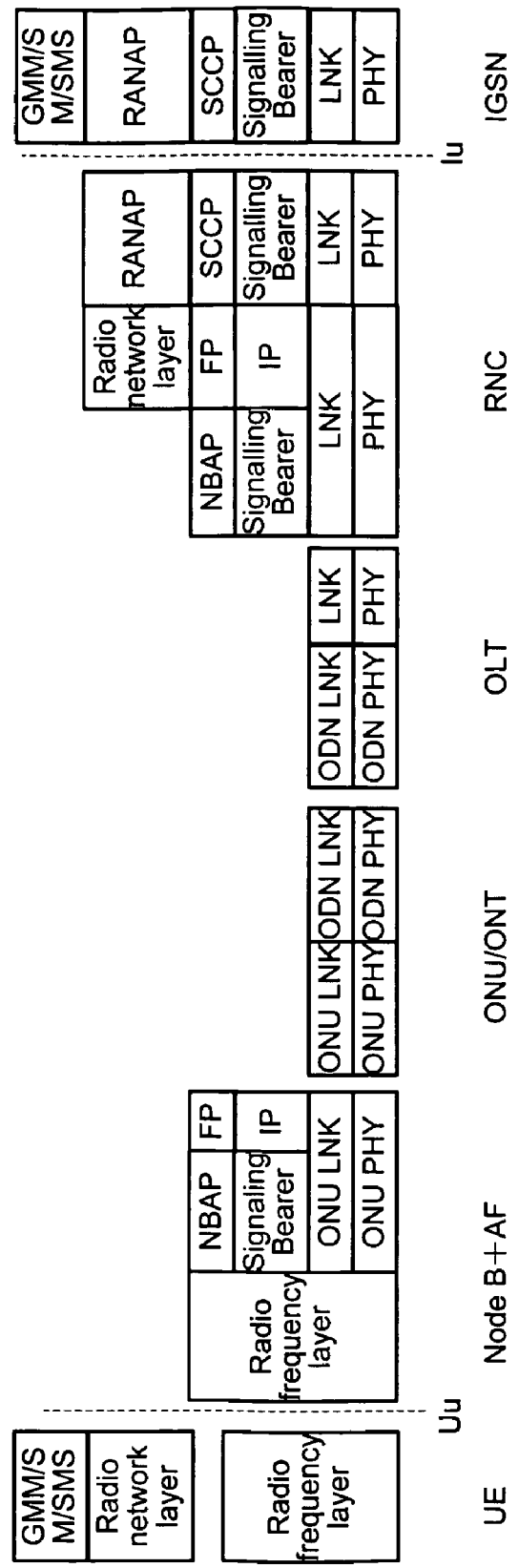
Figure 15:
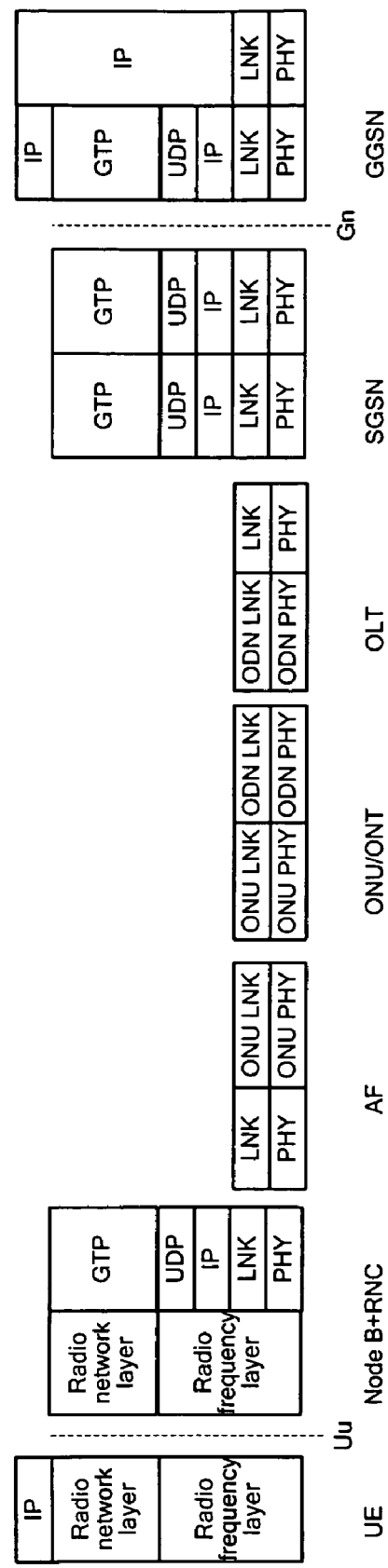
Figure 16:
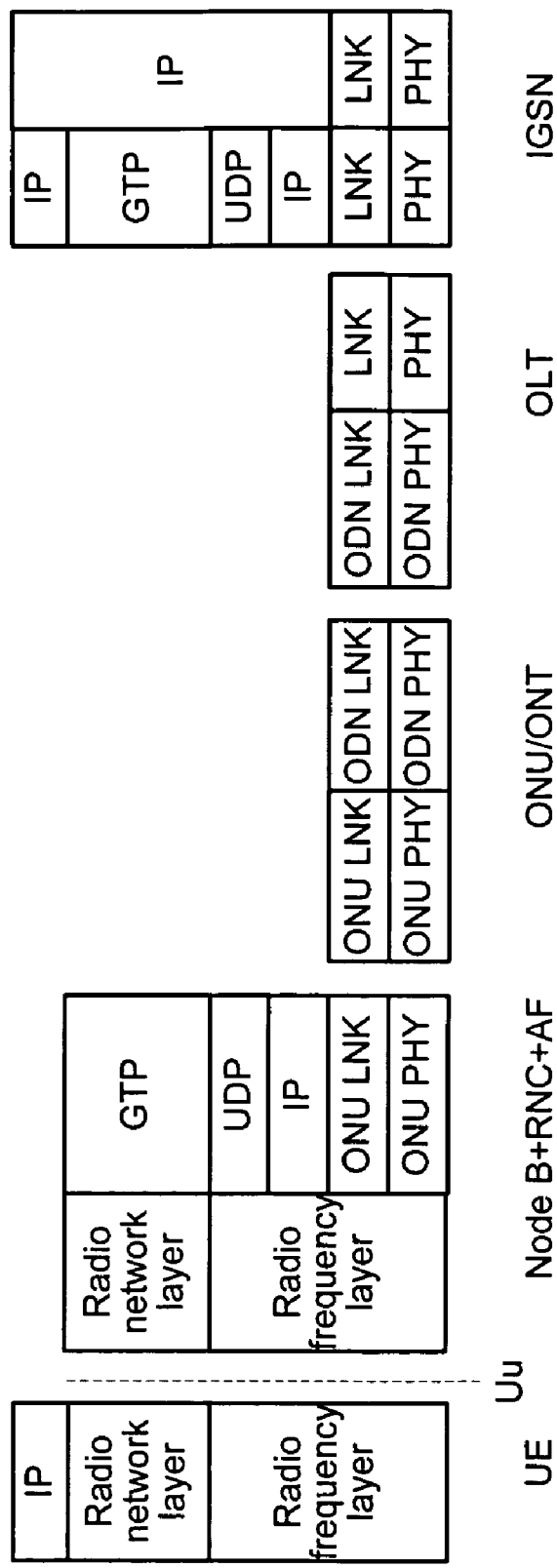
Figure 17:
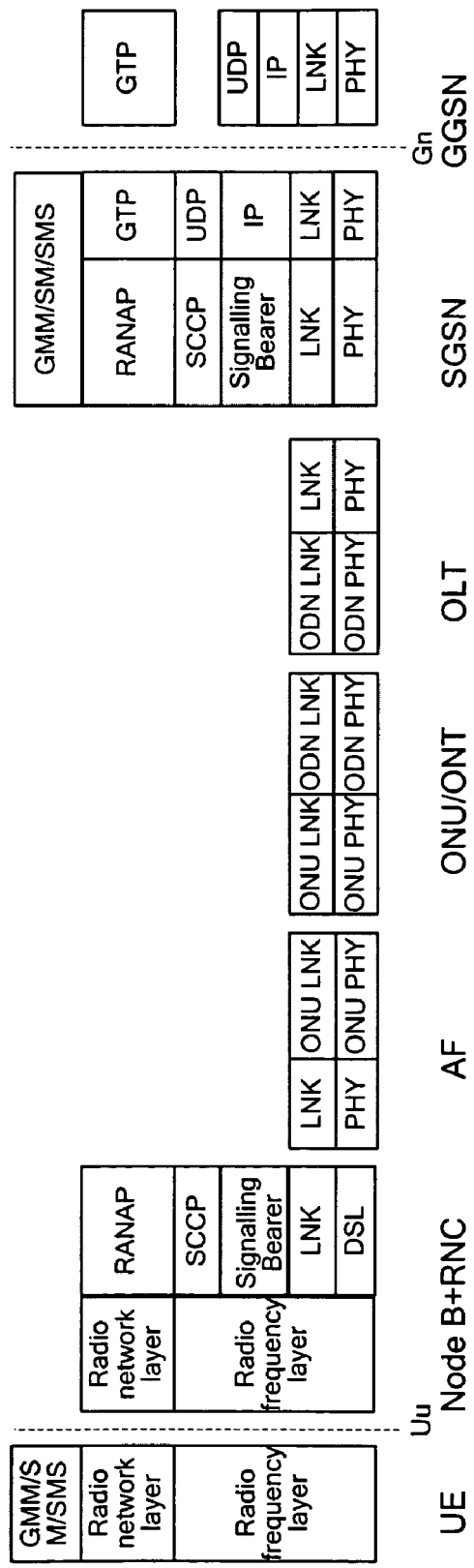
Figure 18:
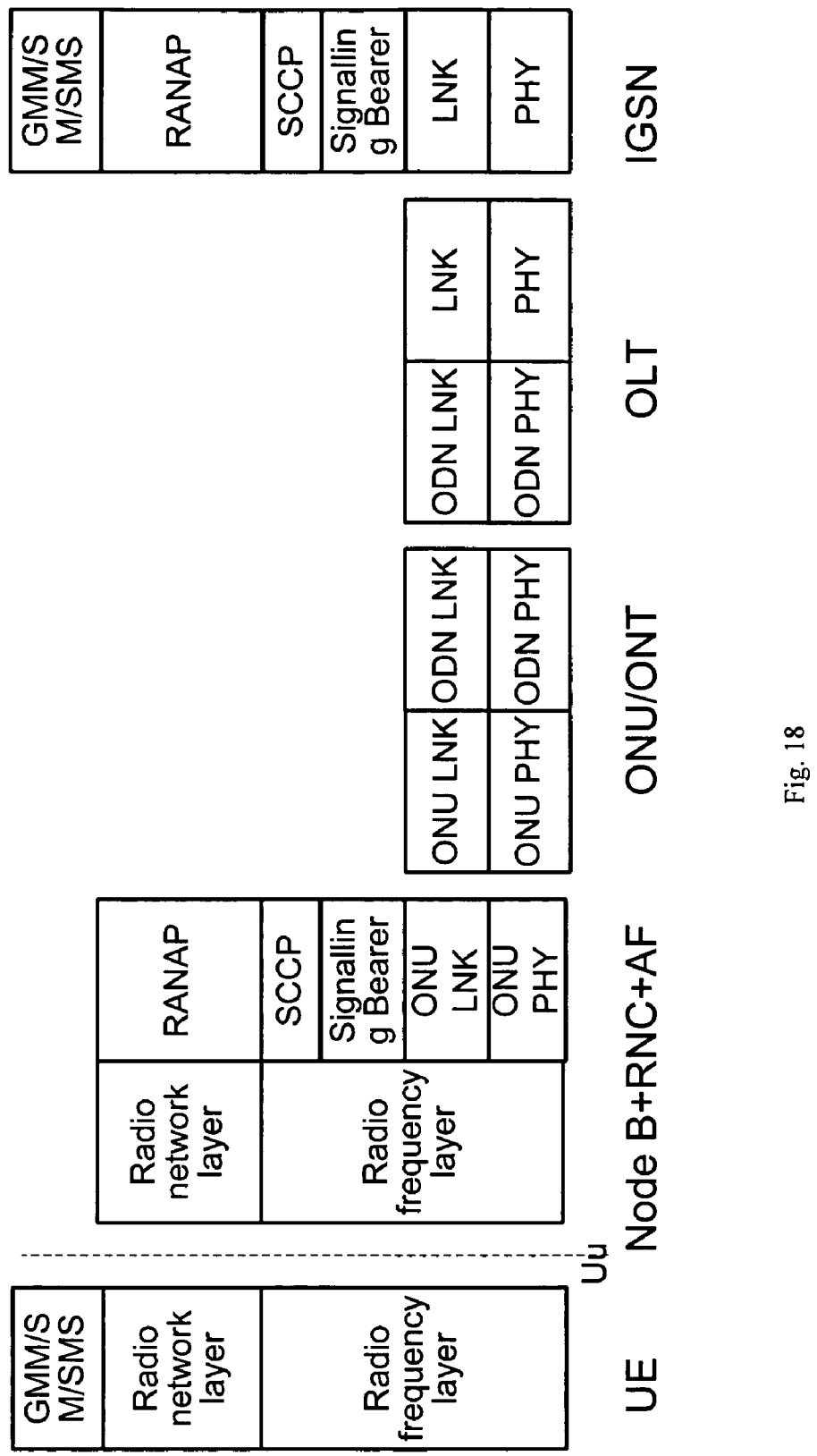
Figure 19:
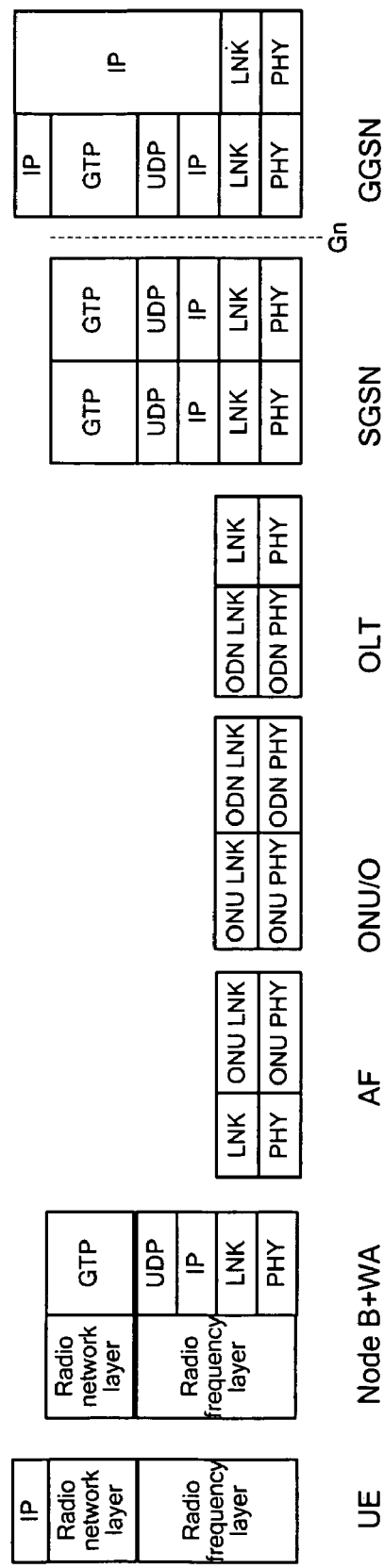
Figure 20:
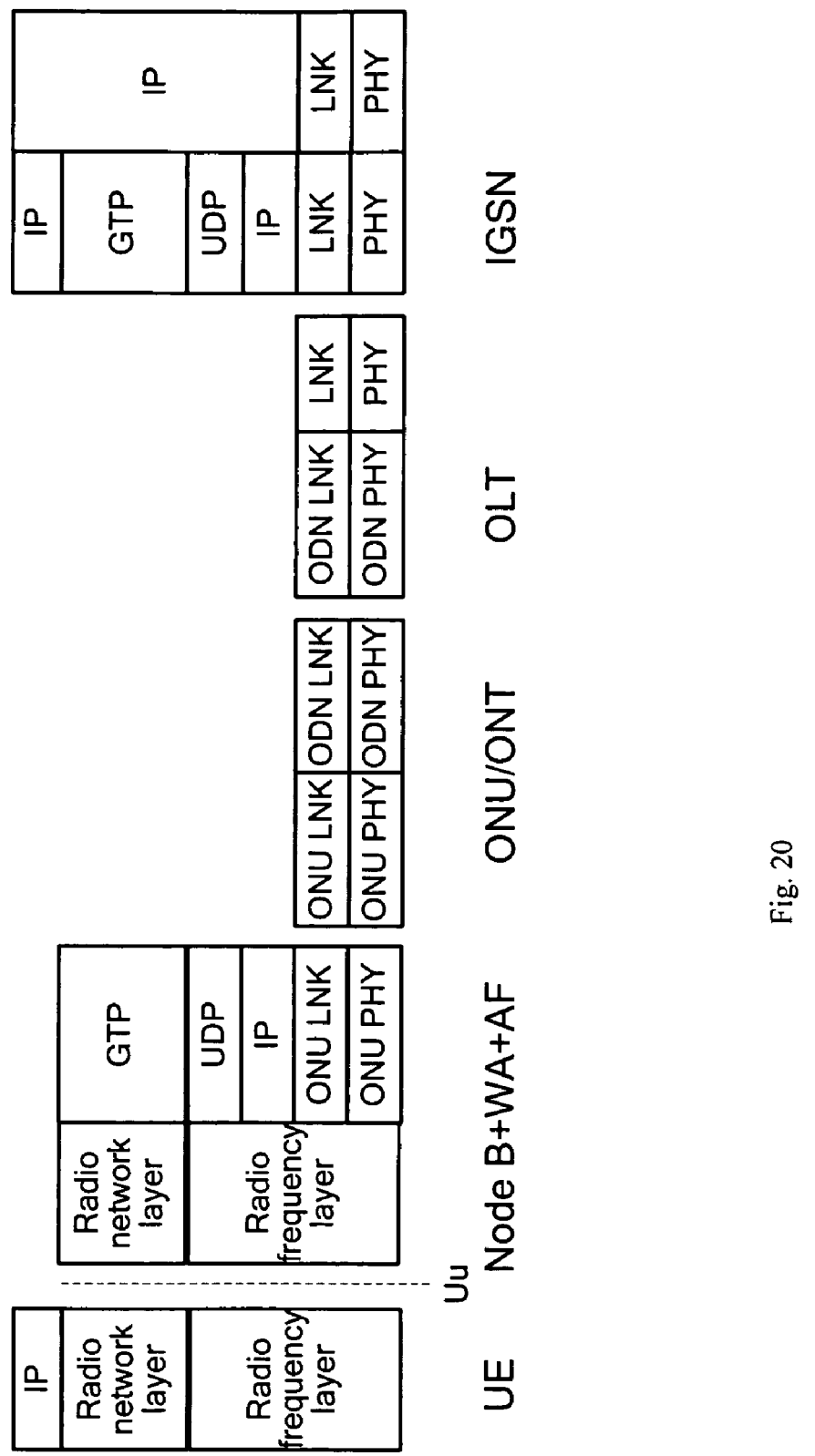
Figure 21:
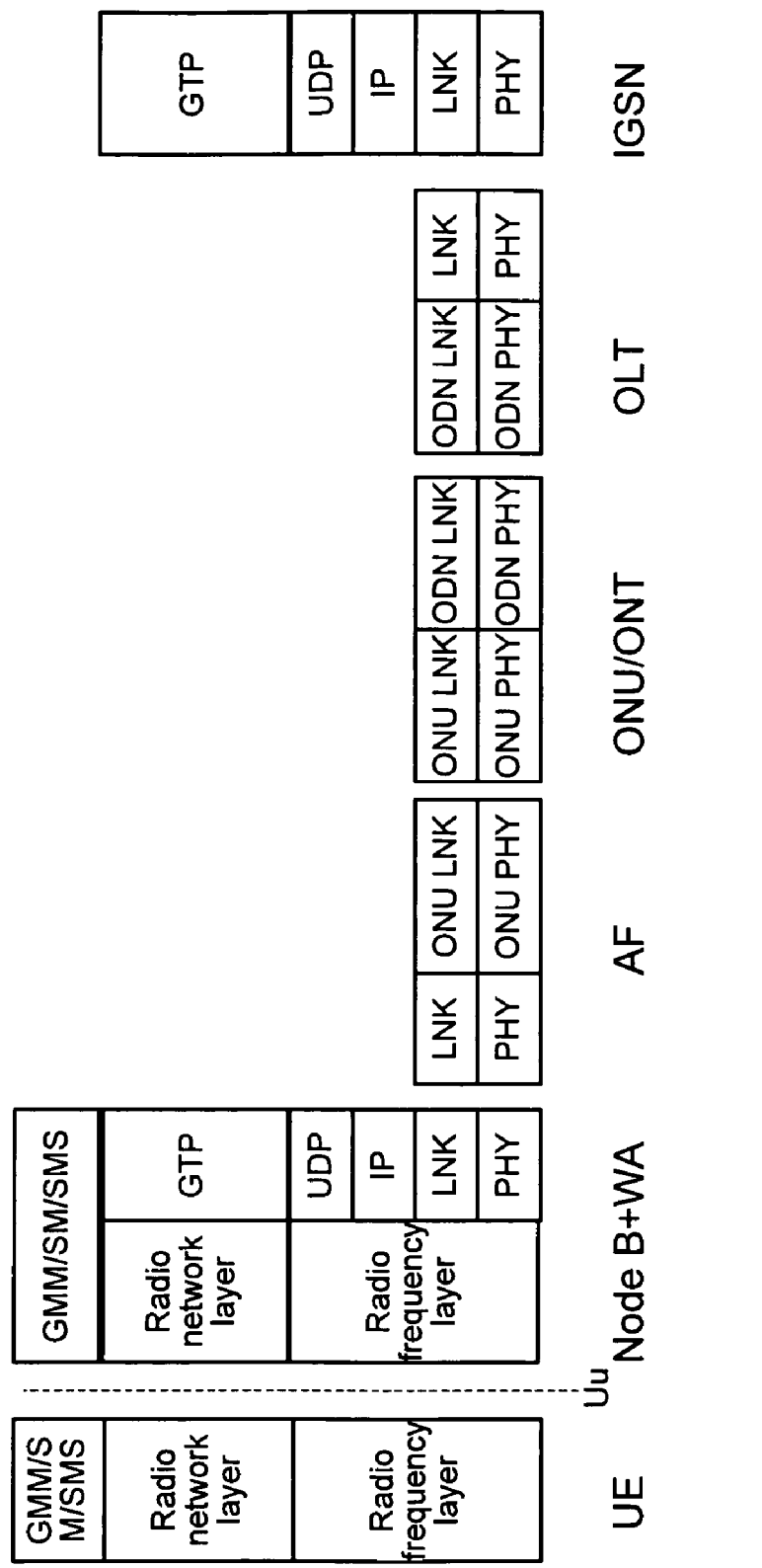
Figure 22:
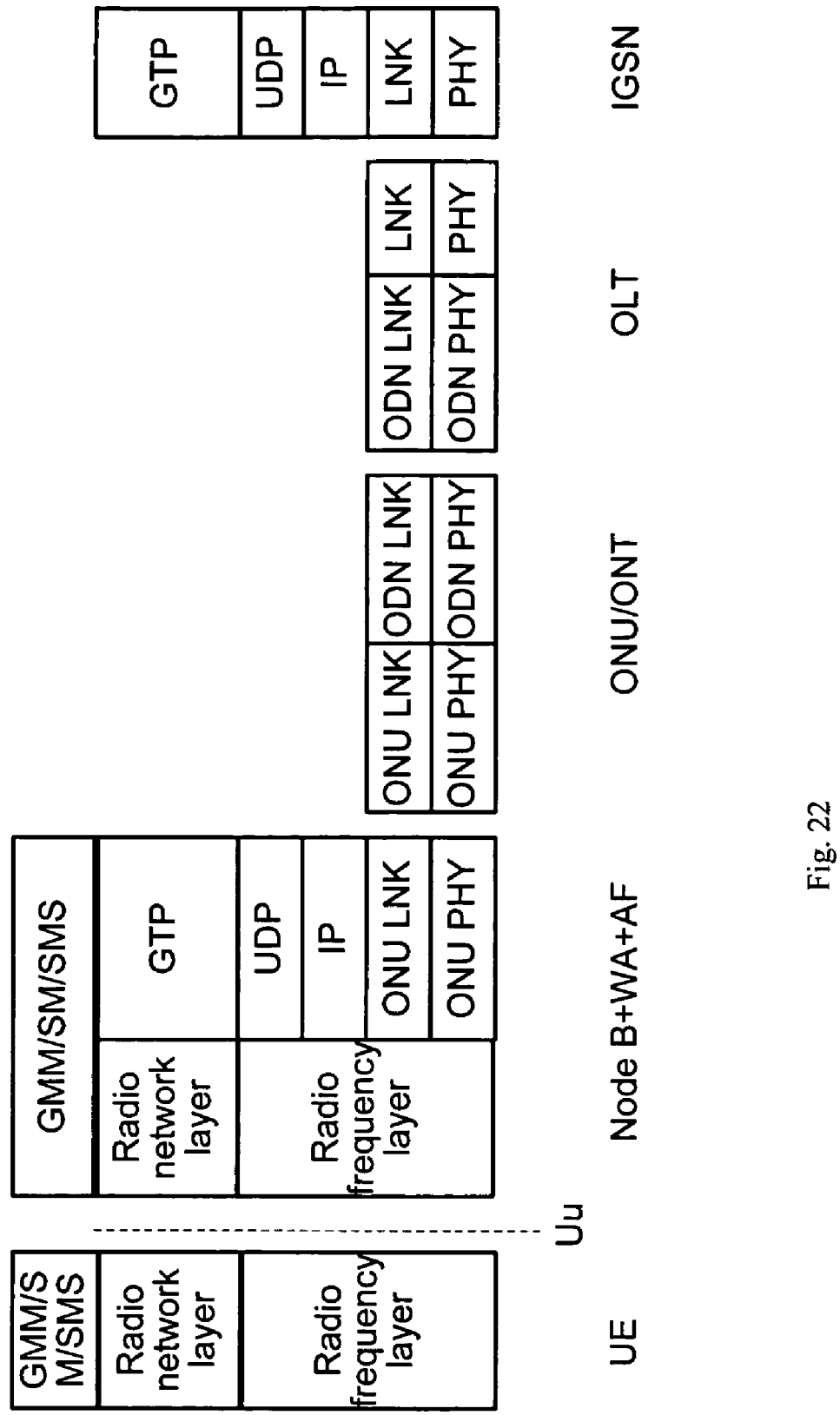
Figure 23:
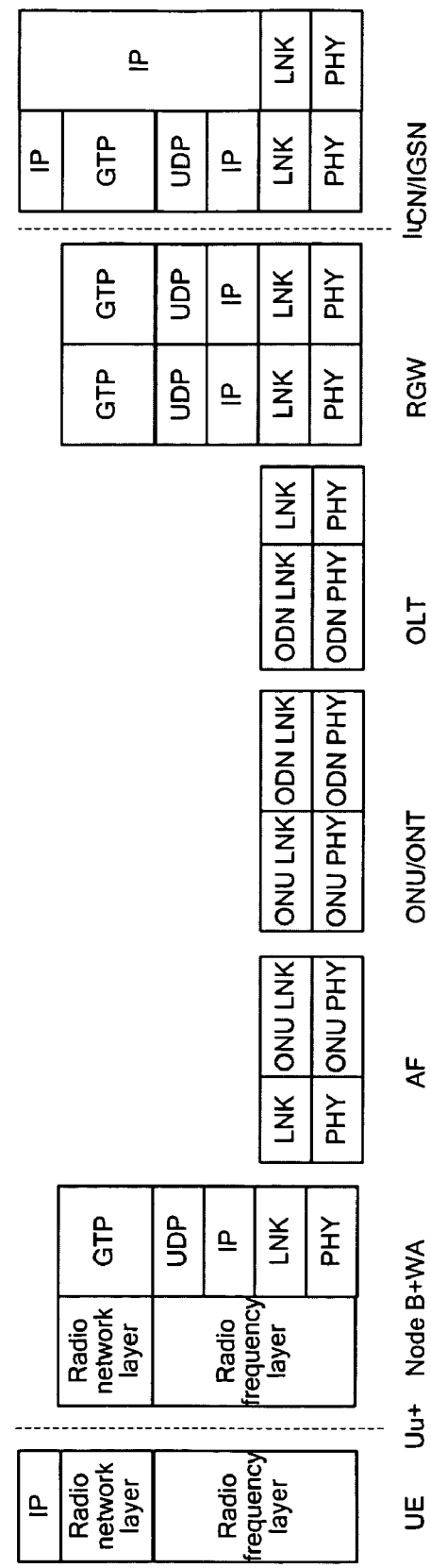
Figure 24:
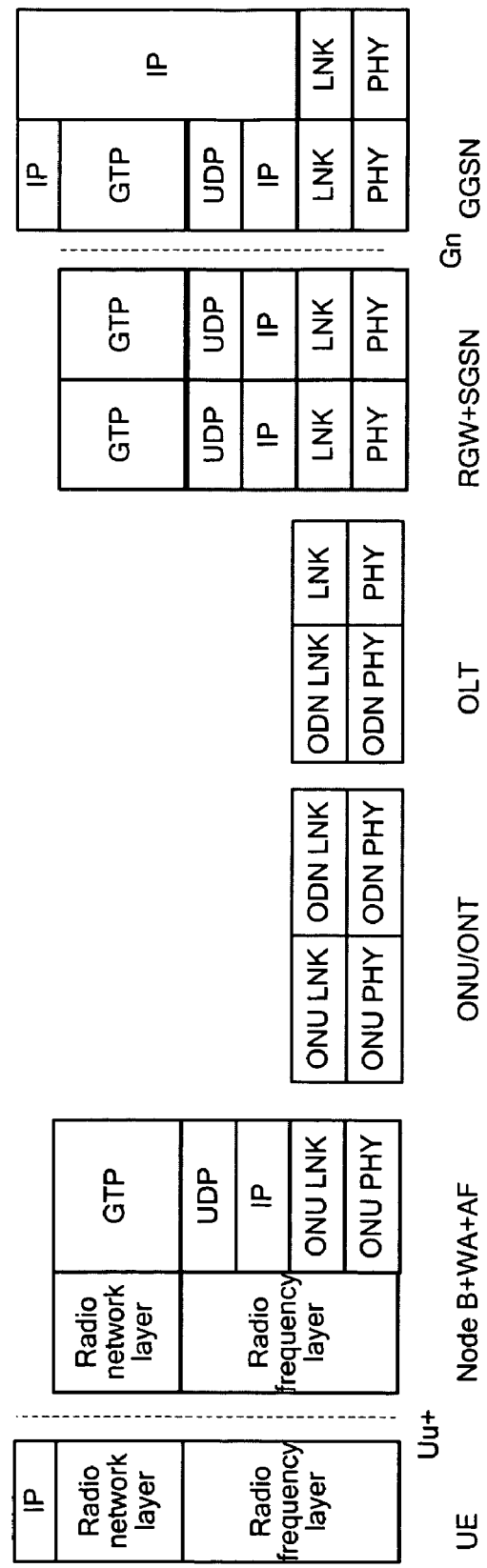
Figure 25:
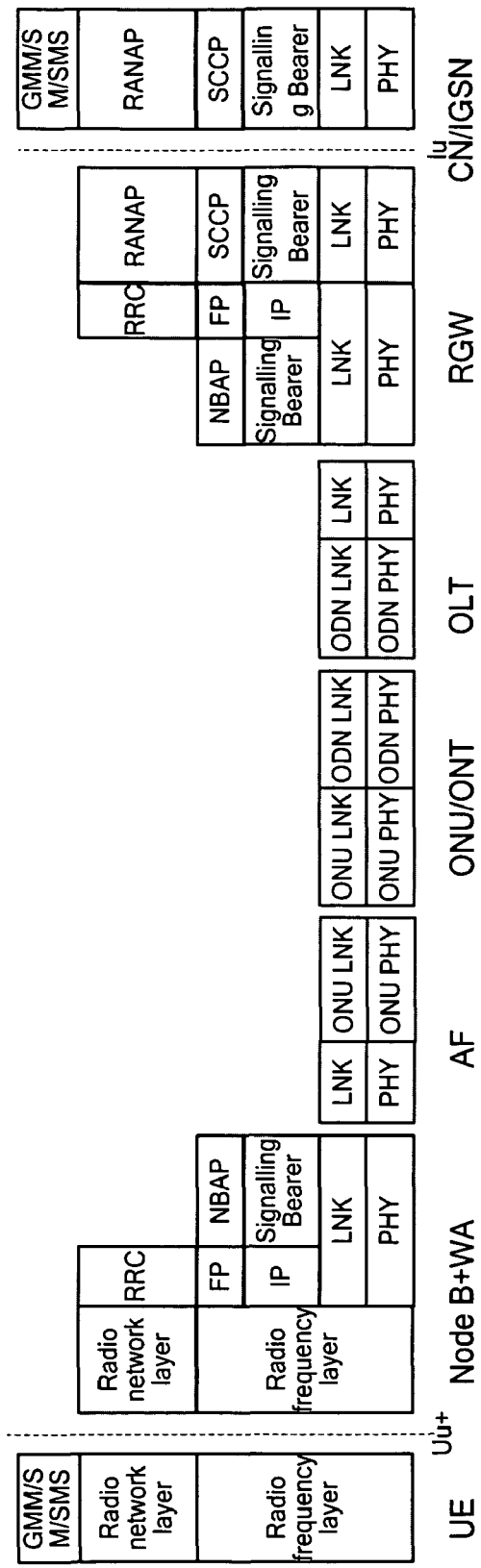
Figure 26:
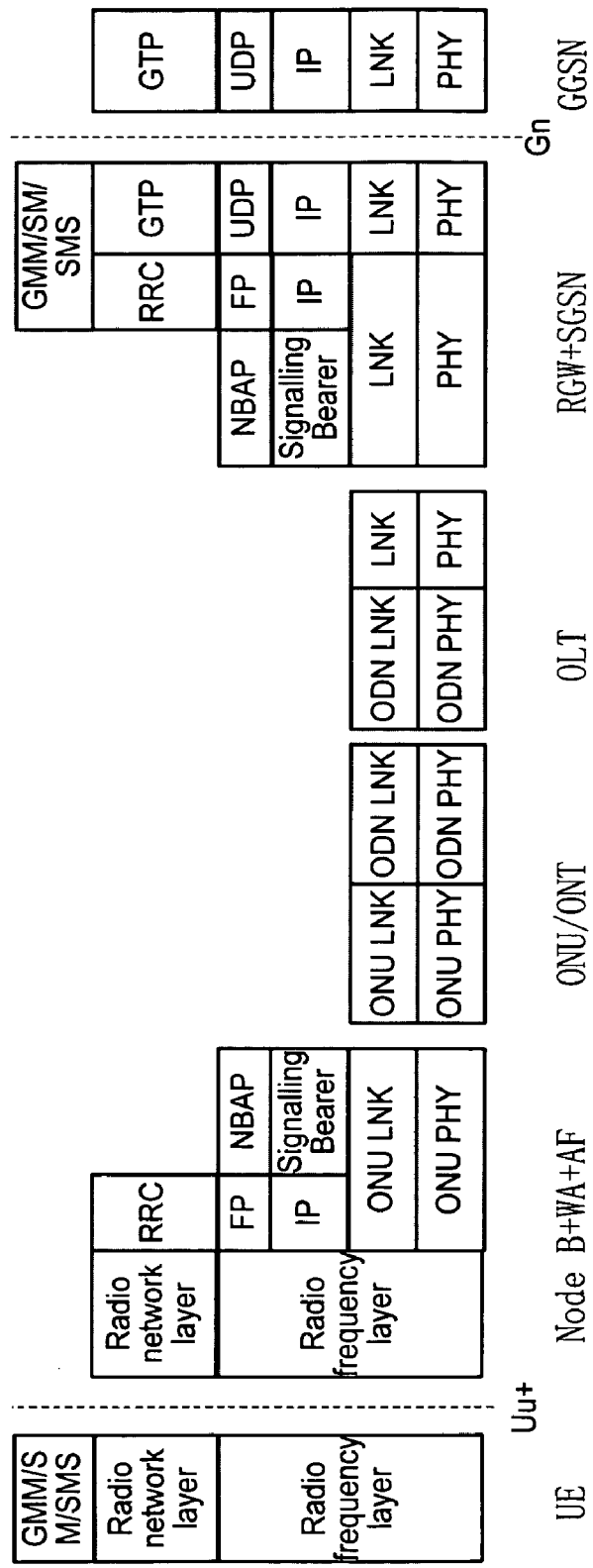
Figure 27:
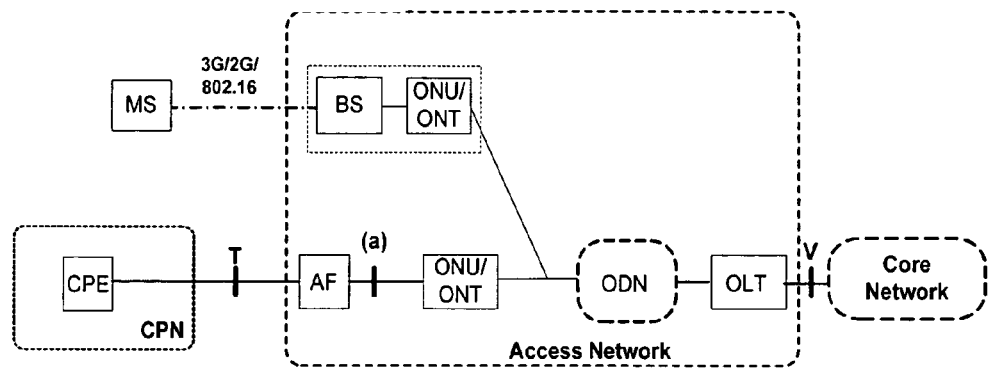
Figure 28:
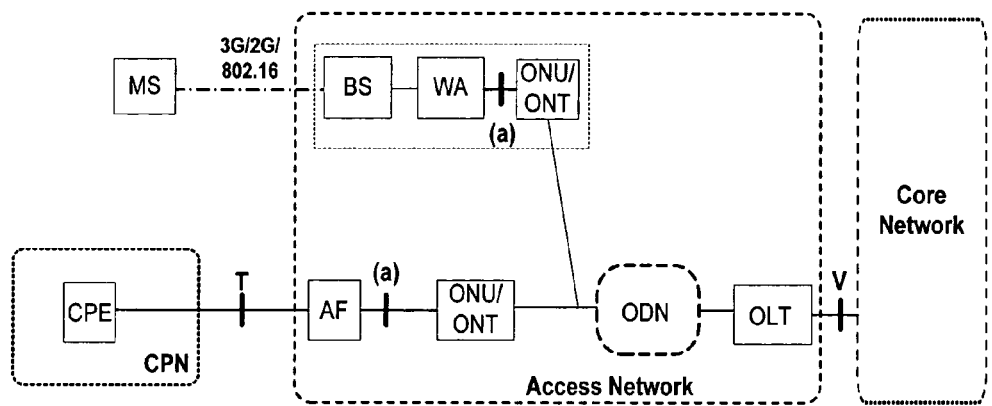
Figure 29:
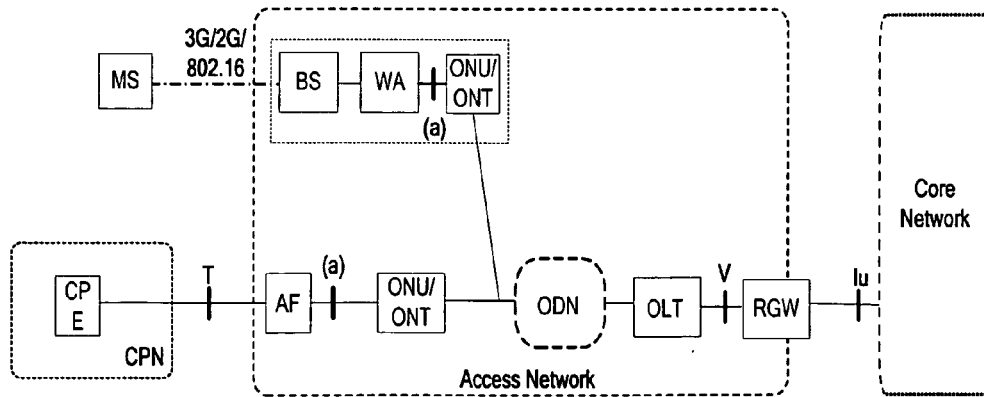
Figure 30:
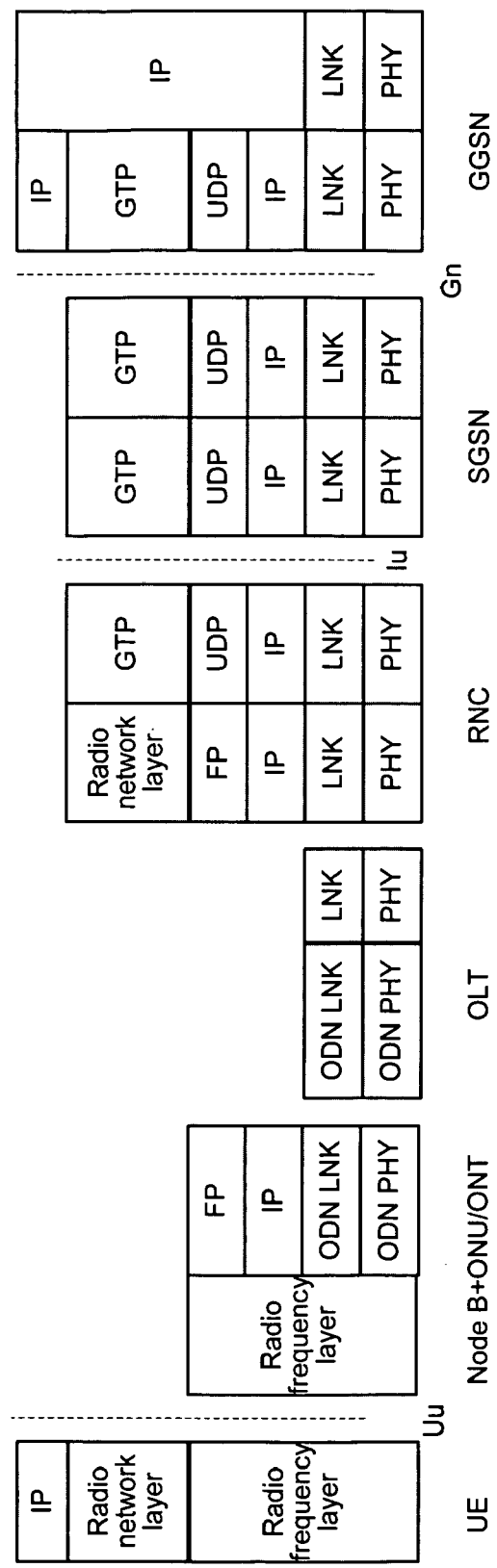
Figure 31:
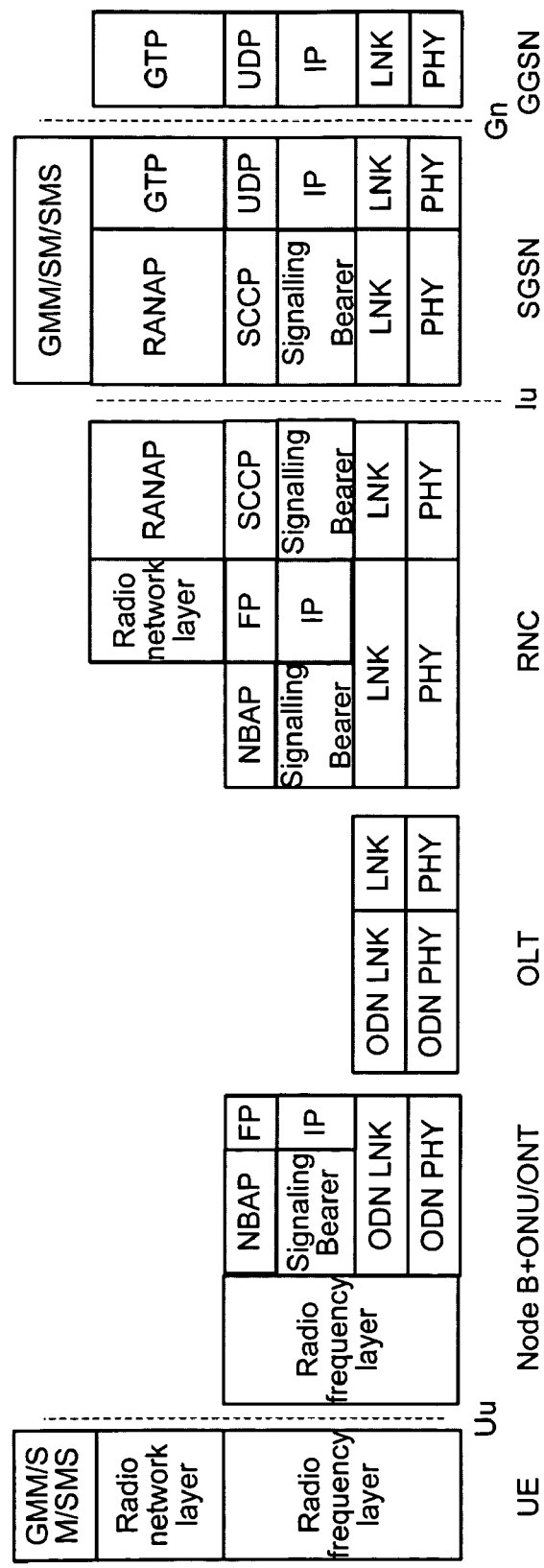
Figure 32:
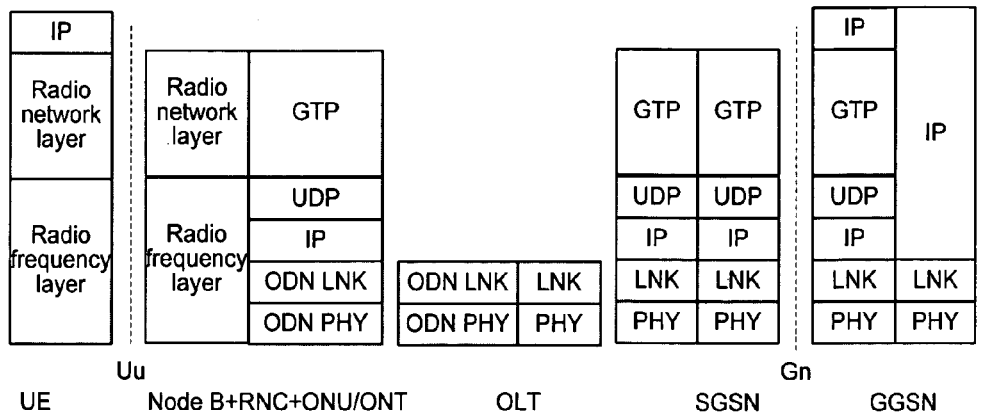
Figure 33:
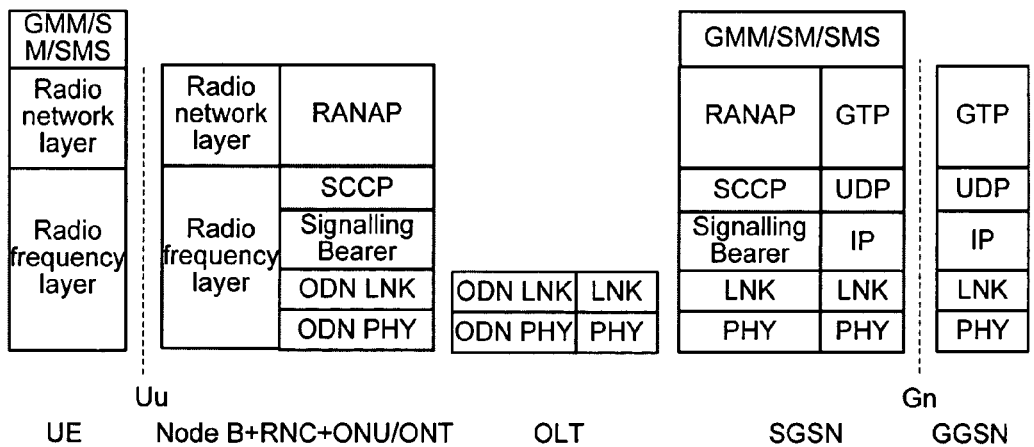
Figure 34:
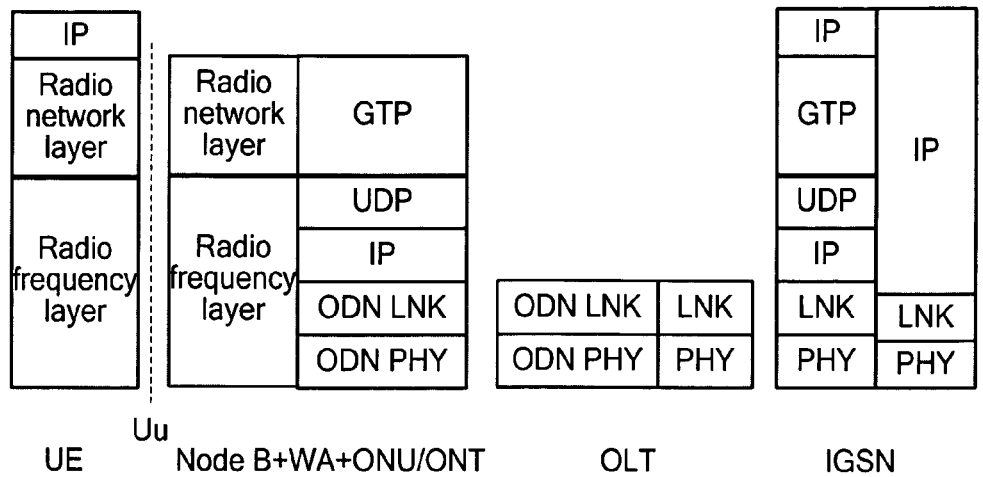
Figure 35:
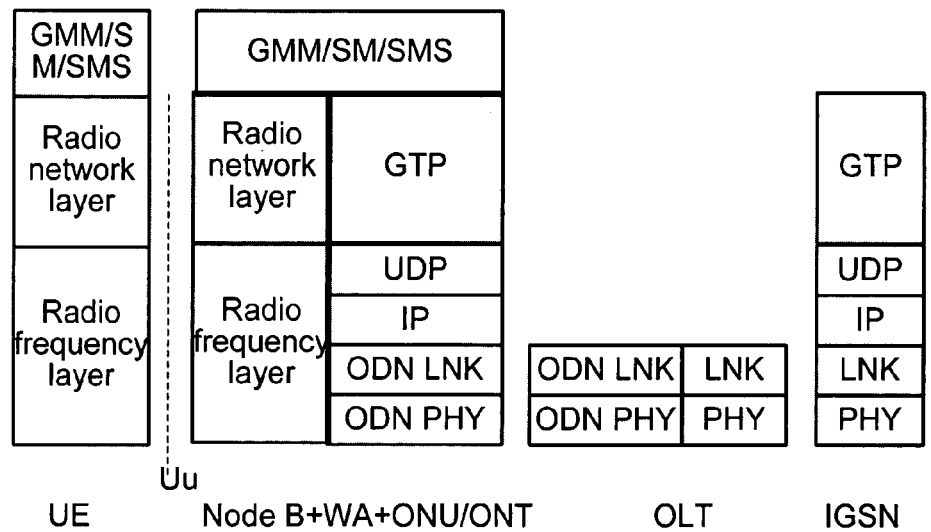
Figure 36:
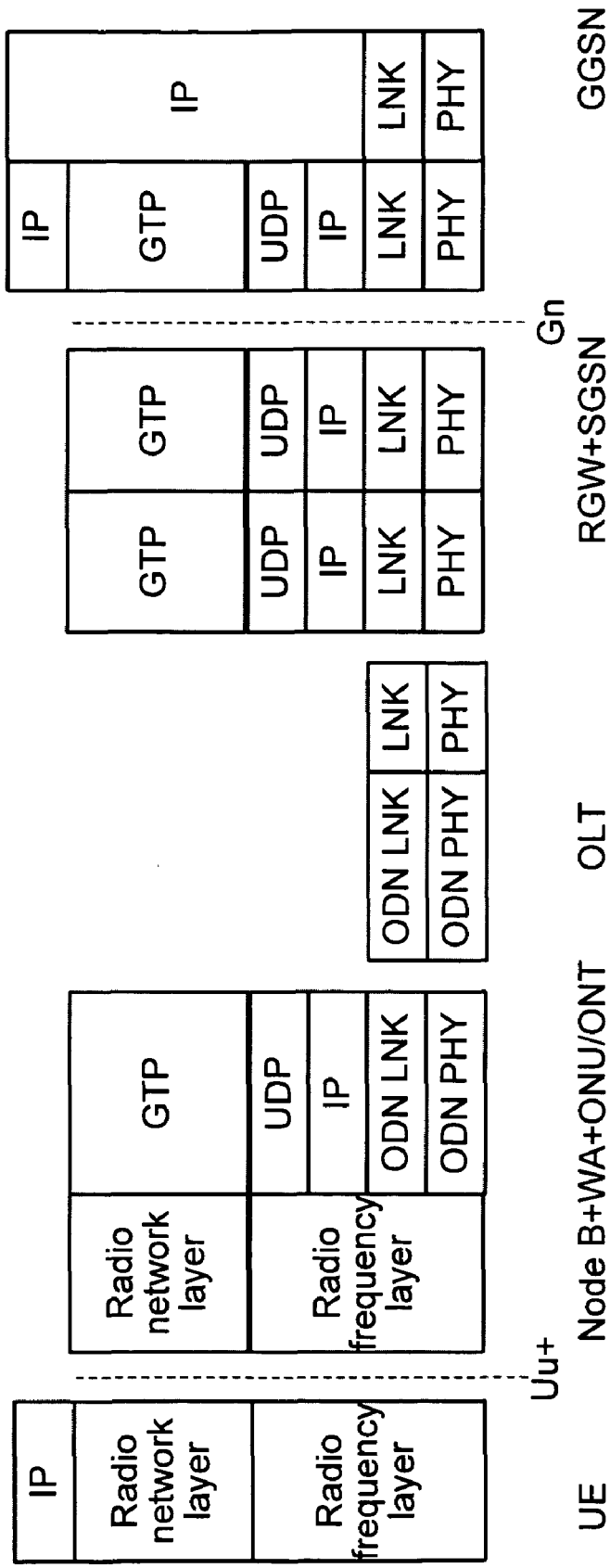
Figure 37:
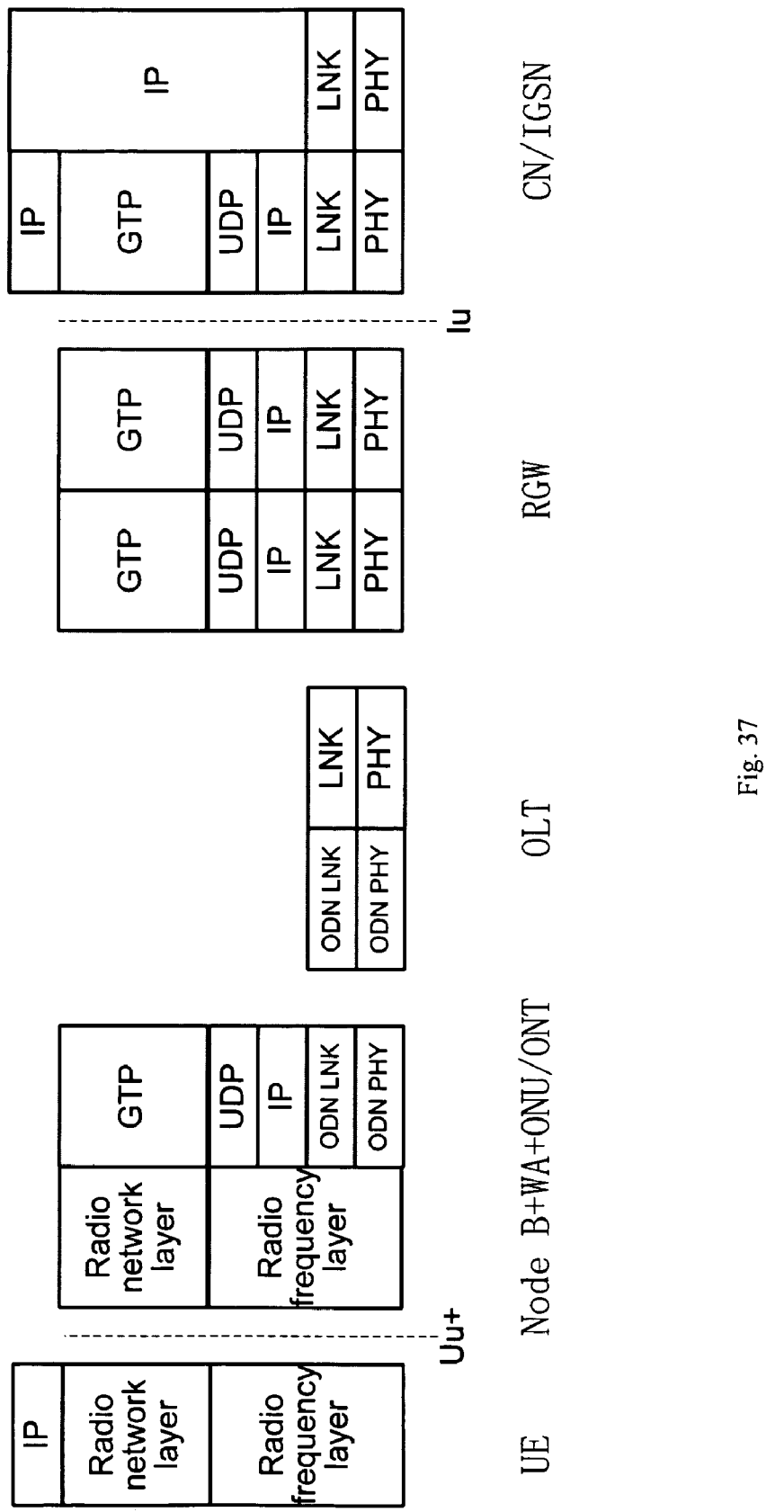
Figure 38:
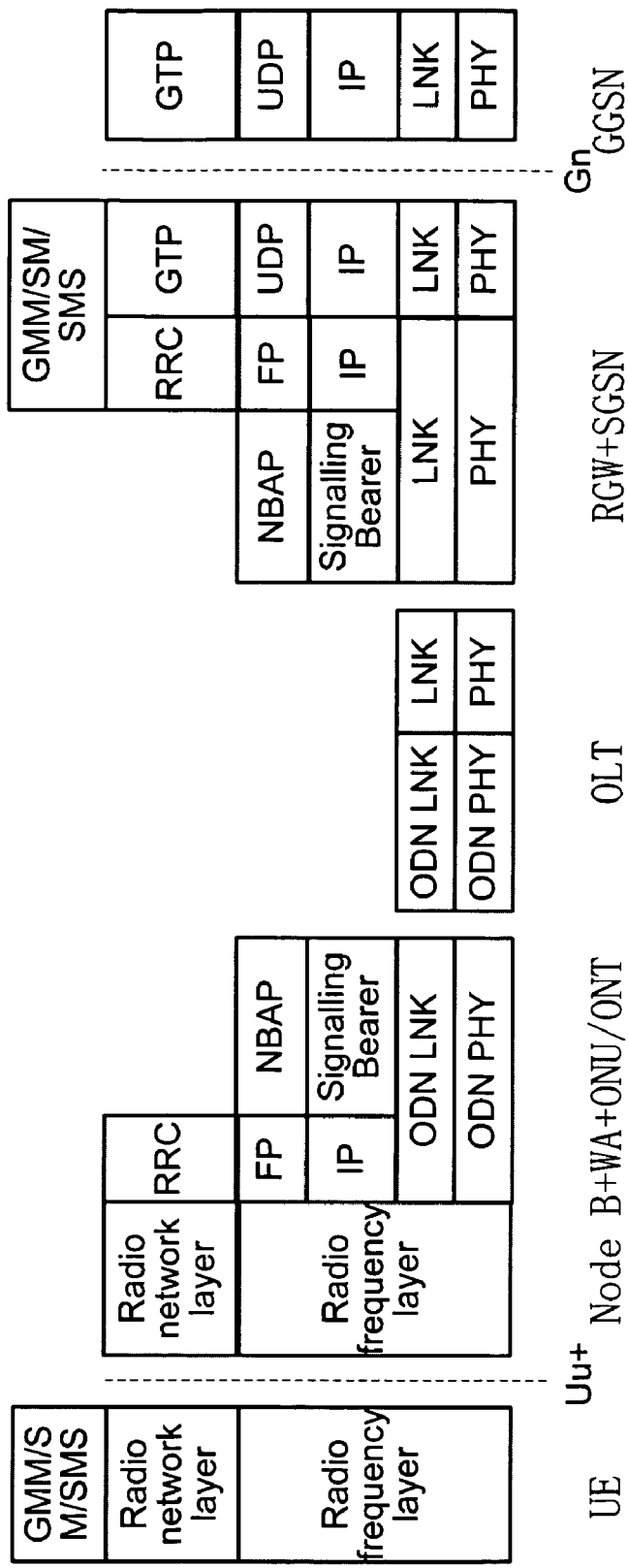
Figure 39:
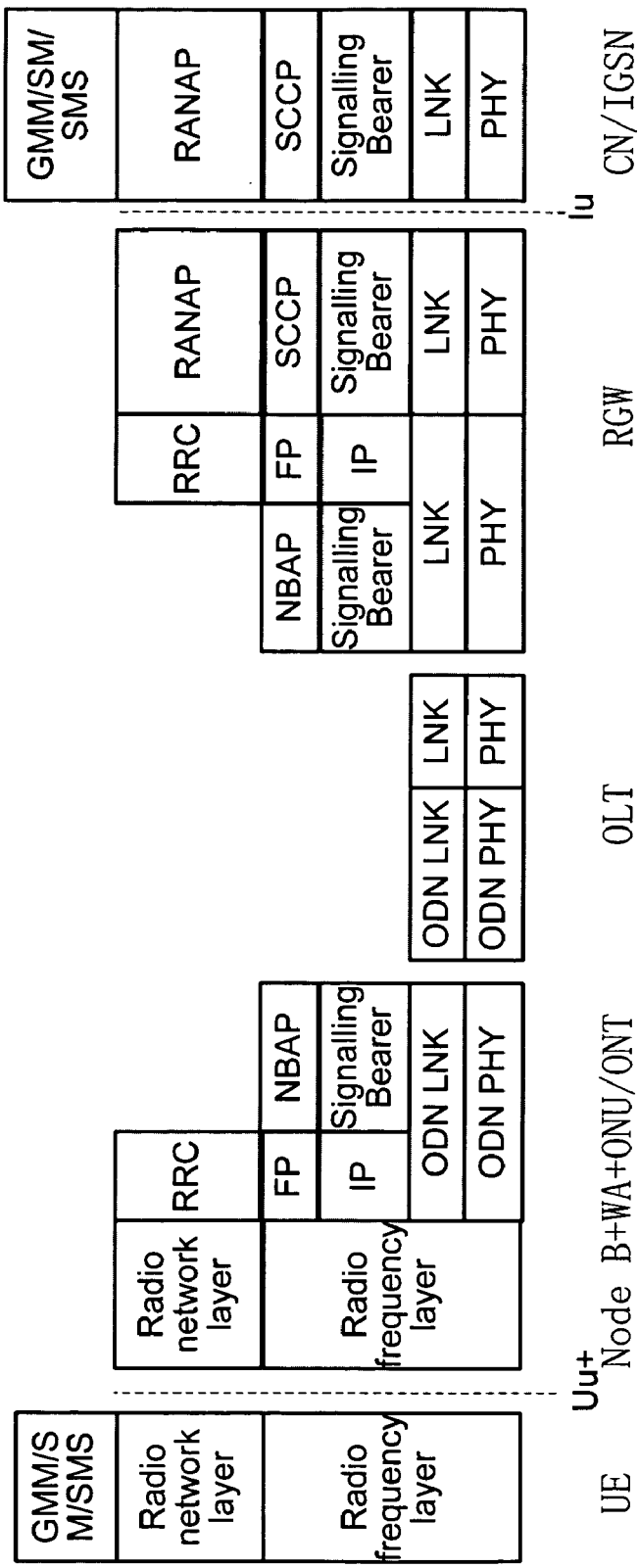
Figure 40:
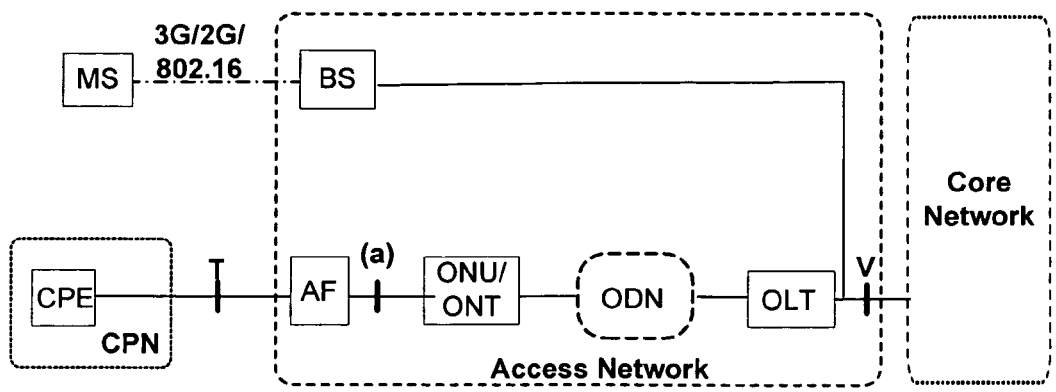
Figure 41:
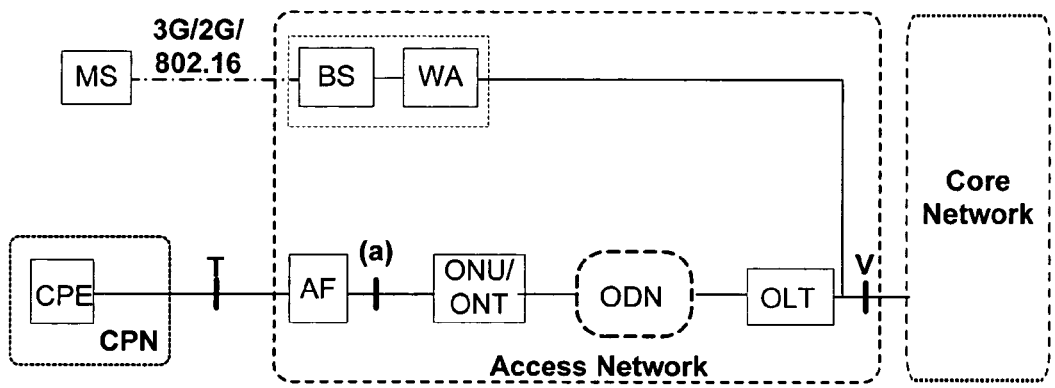
Figure 42:
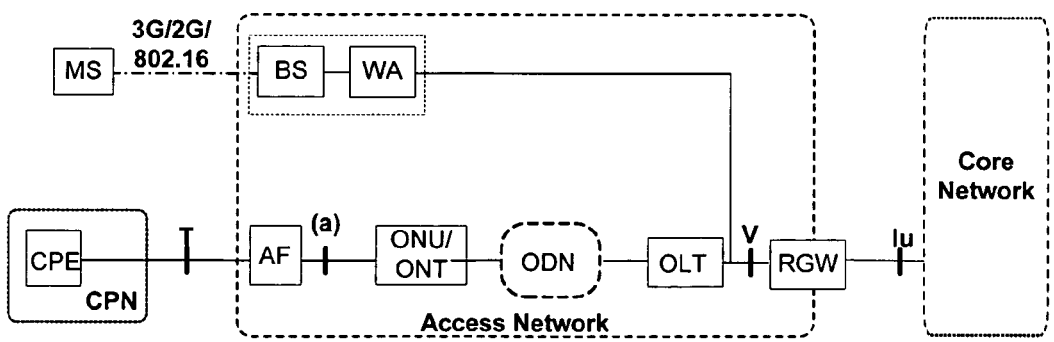
Figure 43:
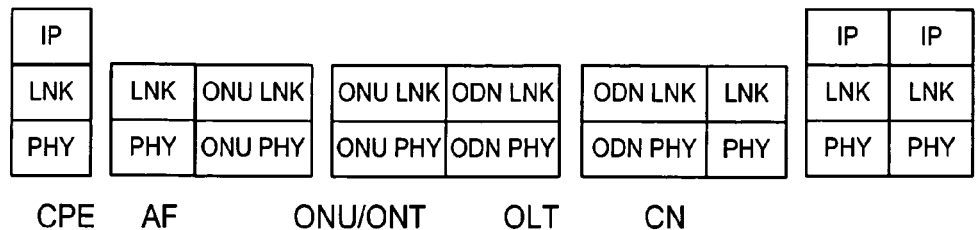
Figure 44:
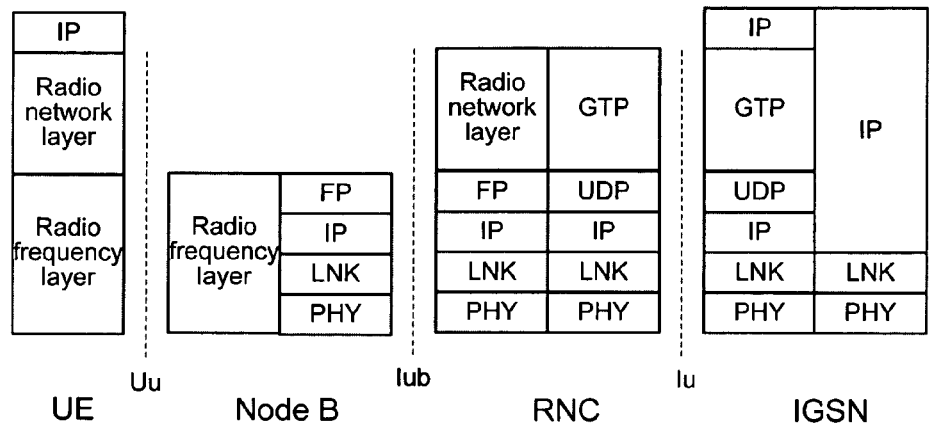
Figure 45:
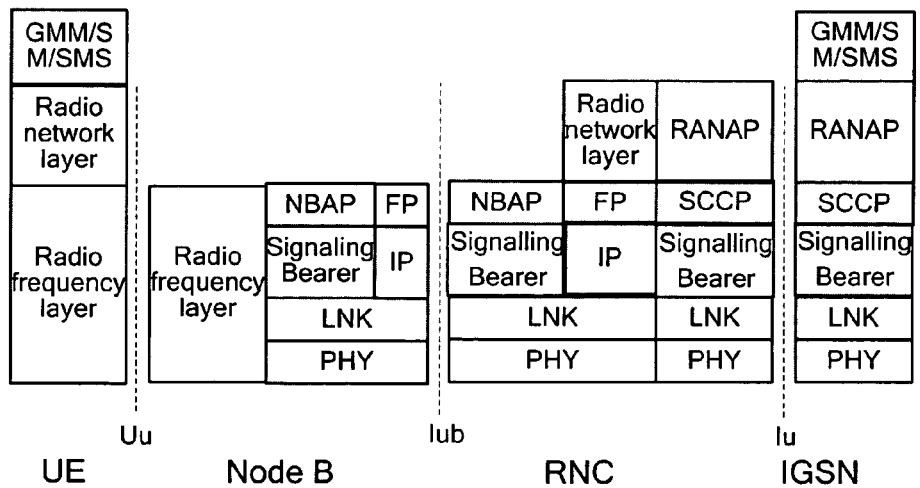
Figure 46:
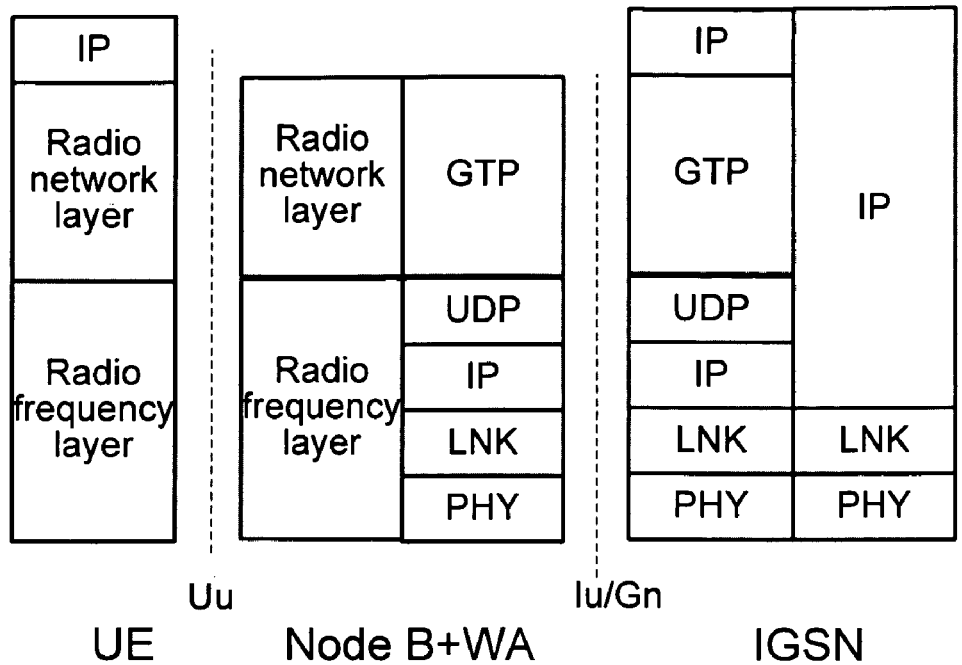
Figure 47:
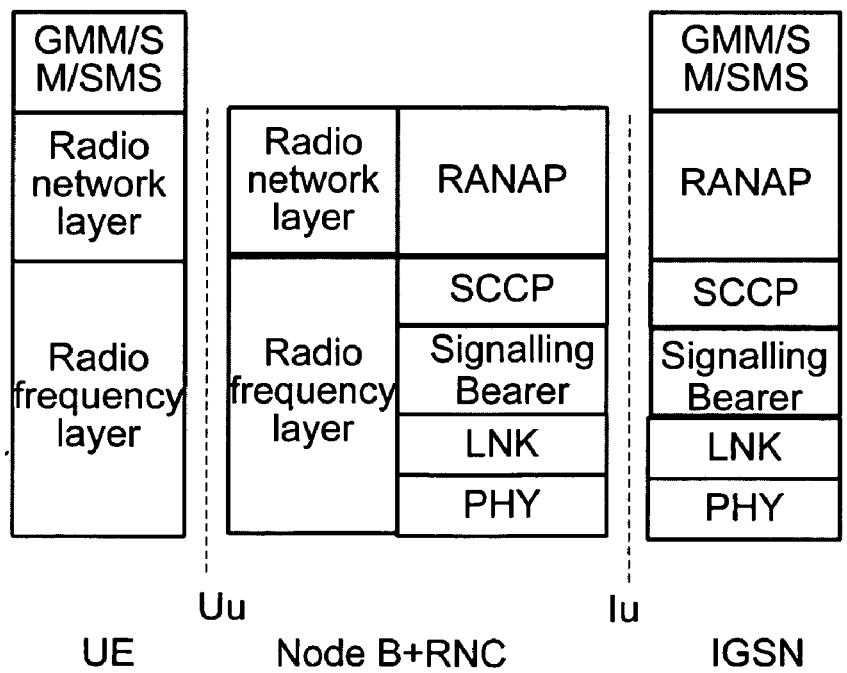
Figure 48:
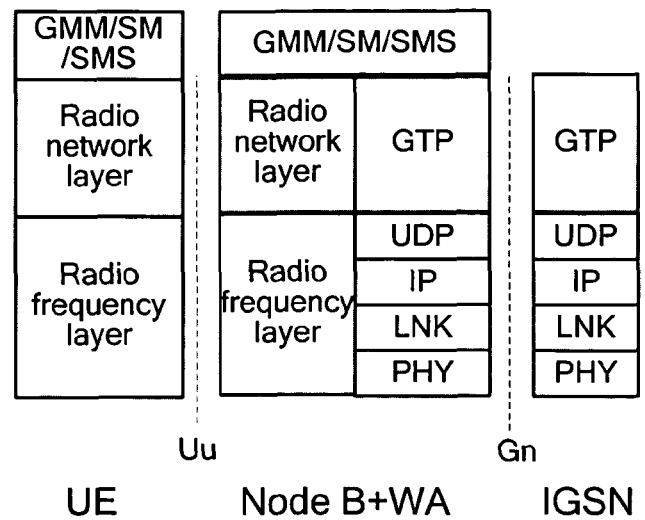
Figure 49:
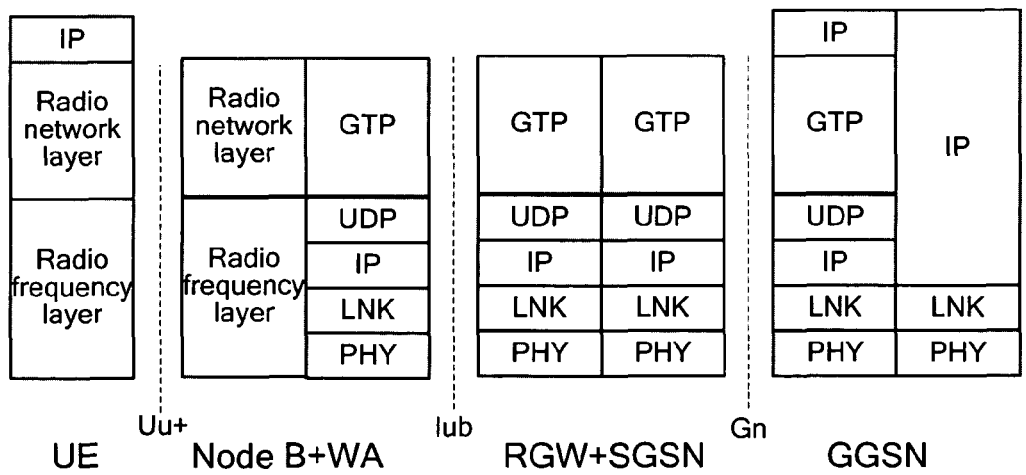
Figure 50:
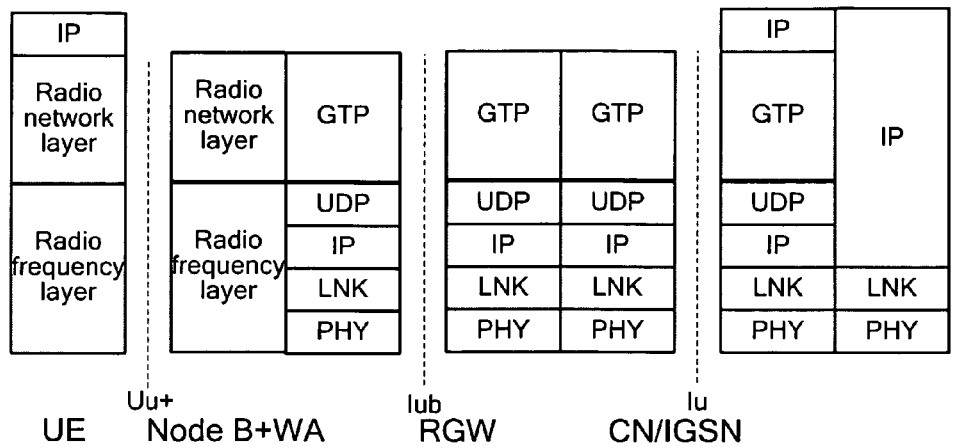
Figure 51:
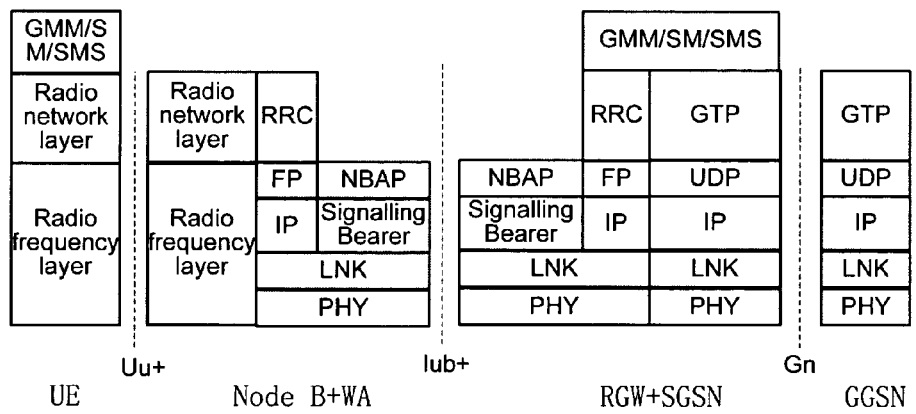
Figure 52:
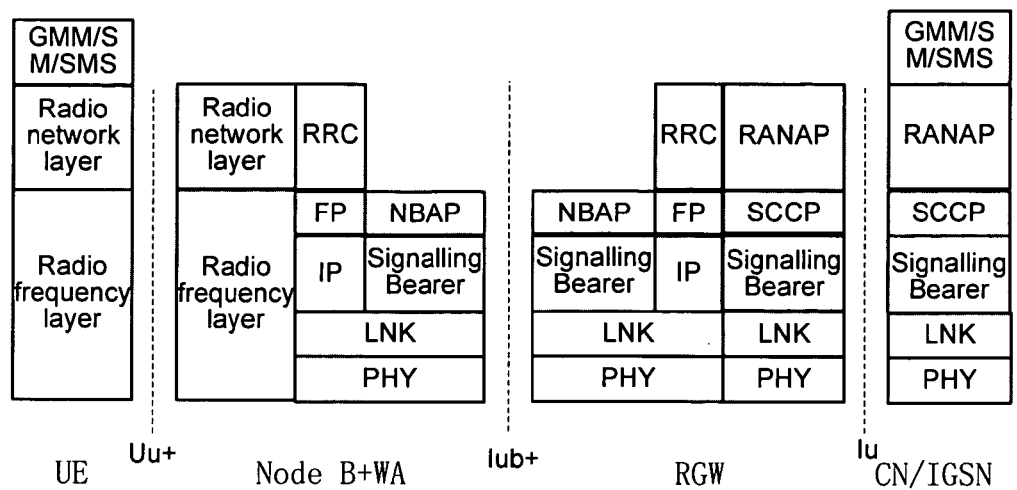

FIGS. 7*a* and 7*b* are schematics of the mobile network user plane and control plane protocol stack structures in which the radio interface function moves down;

FIG. 8 shows the interconnection between the OAN and the radio communication network in accordance with a first embodiment of a first method;

FIG. 9 shows the interconnection between the OAN and the radio communication network in accordance with a second embodiment of the first method;

FIG. 10 shows the interconnection between the OAN and the radio communication network in accordance with a third embodiment of the first method;

FIG. 11 is a schematic of the user plane protocol stack structure in Pattern 1 of the first method for interconnecting the OAN and the radio communication network in which the BS and the AF element are separated;

FIG. 12 is a schematic of the user plane protocol stack structure in Pattern 1 of the first method for interconnecting the OAN and the radio communication network in which the BS and the AF element are integrated into one element;

FIG. 13 is a schematic of the control plane protocol stack structure in Pattern 1 of the first method for interconnecting the OAN and the radio communication network in which the BS and the AF elements are separated;

FIG. 14 is a schematic of the control plane protocol stack structure in Pattern 1 of the first method for interconnecting the OAN and the radio communication network in which the BS and the AF elements are integrated into one element;

FIG. 15 is a schematic of the user plane protocol stack structure in Pattern 2 of the first method for interconnecting the OAN and the radio communication network in which the BS+WA element is separated from the AF element;

FIG. 16 is a schematic of the user plane protocol stack structure in Pattern 2 of the first method for interconnecting the OAN and the radio communication network in which the BS, WA and the AF elements are integrated into one element;

FIG. 17 is a schematic of the control plane protocol stack structure in Pattern 2 of the first method for interconnecting the OAN and the radio communication network in which the BS+WA element is separated from the AF element;

FIG. 18 is a schematic of the control plane protocol stack structure in Pattern 2 of the first method for interconnecting the OAN and the radio communication network in which the BS, WA and the AF elements are integrated into one element;

FIG. 19 is a schematic of the user plane protocol stack structure in Pattern 3 of the first method for interconnecting the OAN and the radio communication network in which the BS+WA element is separated from the AF element;

FIG. 20 is a schematic of the user plane protocol stack structure in Pattern 3 of the first method for interconnecting the OAN and the radio communication network in which the BS, WA and the AF elements are integrated into one element;

FIG. 21 is a schematic of the control plane protocol stack structure in Pattern 3 of the first method for interconnecting the OAN and the radio communication network in which the BS+WA element is separated from the AF element;

FIG. 22 is a schematic of the control plane protocol stack structure in Pattern 3 of the first method for interconnecting the OAN and the radio communication network in which the BS, WA and the AF elements are integrated into one element;

FIG. 23 is a schematic of the user plane protocol stack structure in Pattern 4 of the first method for interconnecting the OAN and the radio communication network in which the BS+WA element is separated from the AF element;

FIG. 24 is a schematic of the user plane protocol stack structure in Pattern 4 of the first method for interconnecting the OAN and the radio communication network in which the BS, WA and the AF elements are integrated into one element and the RGW and SGSN elements are integrated into another entity;

FIG. 25 is a schematic of the control plane protocol stack structure in Pattern 4 of the first method for interconnecting the OAN and the radio communication network in which the BS+WA element is separated from the AF element;

FIG. 26 is a schematic of the control plane protocol stack structure in Pattern 4 of the first method for interconnecting the OAN and the radio communication network in which the BS, WA and the AF elements are integrated into one element and the RGW and SGSN elements are integrated into another entity;

FIG. 27 shows the interconnection between the OAN and the radio communication network in accordance with a first embodiment of a second method;

FIG. 28 shows the interconnection between the OAN and the radio communication network in accordance with a second embodiment of the second method;

FIG. 29 shows the interconnection between the OAN and the radio communication network in accordance with a third embodiment of the second method;

FIG. 30 is a schematic of the user plane protocol stack structure in Pattern 1 of the second method for interconnecting the OAN and the radio communication network in which the BS and the ONU or ONT elements are integrated into one element;

FIG. 31 is a schematic of the control plane protocol stack structure in Pattern 1 of the second method for interconnecting the OAN and the radio communication network in which the BS and the ONU or ONT elements are integrated into one element;

FIG. 32 is a schematic of the user plane protocol stack structure in Pattern 2 of the second method for interconnecting the OAN and the radio communication network in which the BS, WA and the ONU or ONT elements are integrated into one element;

FIG. 33 is a schematic of the control plane protocol stack structure in Pattern 2 of the second method for interconnecting the OAN and the radio communication network in which the BS, WA and the ONU or ONT elements are integrated into one element;

FIG. 34 is a schematic of the user plane protocol stack structure in Pattern 3 of the second method for interconnecting the OAN and the radio communication network in which the BS, WA and the ONU or ONT elements are integrated into one element;

FIG. 35 is a schematic of the control plane protocol stack structure in Pattern 3 of the second method for interconnecting the OAN and the radio communication network in which the BS, WA and the ONU or ONT elements are integrated into one element;

FIG. 36 is a schematic of the user plane protocol stack structure in Pattern 4 of the first method for interconnecting the OAN and the radio communication network in which the BS, WA and the ONU or ONT elements are integrated into one element and the RGW and SGSN elements are integrated into another entity;

FIG. 37 is a schematic of the user plane protocol stack structure in Pattern 4 of the second method for interconnecting the OAN and the radio communication network in which the BS, WA and the ONU or ONT elements are integrated into one element;

FIG. 38 is a schematic of the control plane protocol stack structure in Pattern 4 of the first method for interconnecting the OAN and the radio communication network in which the BS, WA and the ONU or ONT elements are integrated into one element and the RGW and SGSN elements are integrated into another entity;

FIG. 39 is a schematic of the control plane protocol stack structure in Pattern 4 of the second method for interconnecting the OAN and the radio communication network in which the BS, WA and the ONU or ONT elements are integrated into one element;

FIG. 40 shows the interconnection between the OAN and the radio communication network in accordance with a first embodiment of a third method;

FIG. 41 shows the interconnection between the OAN and the radio communication network in accordance with a second embodiment of the third method;

FIG. 42 shows the interconnection between the OAN and the radio communication network in accordance with a third embodiment of the third method;

FIG. 43 is a schematic of the user plane and the control plane protocol stack structures of the OAN in Pattern 1 of the third method for interconnecting the OAN and the radio communication network;

FIG. 44 is a schematic of the user plane protocol stack structure of the radio communication network in Pattern 1 of the third method for interconnecting the OAN and the radio communication network;

FIG. 45 is a schematic of the control plane protocol stack structure of the radio communication network in Pattern 1 of the third method for interconnecting the OAN and the radio communication network;

FIG. 46 is a schematic of the user plane protocol stack structure of the radio communication network in Pattern 2 or 3 of the third method for interconnecting the OAN and the radio communication network;

FIG. 47 is a schematic of the control plane protocol stack structure of the radio communication network in Pattern 2 of the third method for interconnecting the OAN and the radio communication network;

FIG. 48 is a schematic of the control plane protocol stack structure of the radio communication network in Pattern 3 of the third method for interconnecting the OAN and the radio communication network;

FIG. 49 is a schematic of the user plane protocol stack structure in Pattern 4 of the third method for interconnecting the OAN and the radio communication network in which the BS and WA elements are integrated into one element and the RGW and SGSN elements are integrated into another entity;

FIG. 50 is a schematic of the user plane protocol stack structure in Pattern 4 of the third method for interconnecting the OAN and the radio communication network in which the BS and the WA element are integrated into one element;

FIG. 51 is a schematic of the control plane protocol stack structure in Pattern 4 of the third method for interconnecting the OAN and the radio communication network in which the BS and WA elements are integrated into one element and the RGW and SGSN elements are integrated into another entity; and FIG. 52 is a schematic of the control plane protocol stack structure in Pattern 4 of the third method for interconnecting the OAN and the radio communication network in which the BS and the WA element are integrated into one element.

DETAILED DESCRIPTION

The following description is merely exemplary in nature and is not intended to limit the present disclosure, application, or uses.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

The present disclosure mainly solves the problem of interconnecting a 3G or 2G radio communication network and an OAN (e.g., a PON access network). In consideration of the disadvantages in the conventional radio communication network, the present disclosure provides a interconnection scheme in which the radio interface protocol stack of the radio network is moved down to a base station before the radio network is tightly or loosely coupled with the OAN and functions as the radio extension of the OAN cable access. Therefore the present disclosure can be applied to, but not limited to, fixed radio, nomad, and portable and mobile access applications.

The base station includes all types of base stations and apparatuses with functions similar to the base station functions in varieties of radio communication network, e.g., BS (Base Station), Node B.

It should be noted that in the following description of embodiments, names of the entity and device in the radio communication network and the optical network are only names of corresponding entity and device in the conventional networks, i.e., the following description includes exemplary applications based on certain conventional radio communication network and optical network. Therefore, in practical applications, entities and apparatuses with different names but the same functions as the entities and apparatus in the following description are also covered by the protection scope.

The embodiments are described in detail hereinafter to make the technical scheme more apparent.

The interconnection between an optical network and a radio communication system can be implemented by interconnecting an Optical Access Network (OAN) with a Radio Access Network (RAN).

The RAN can be divided into several functions to facilitate the application and provide flexibility in the application. For example, the RAN can be divided into functions including: Base Station (BS), Wireless Adaptor (WA) and Radio Gateway (RGW). The WA and the RGW may have different functions in different types of radio communication networks, and the functions are described with reference to four types of radio communication networks hereinafter.

The first type: The WA and RGW can be arranged in any of the following patterns in the RAN of a radio communication networks such as a WCDMA, GPRS or TD-SCDMA network.

No WA or RGW exists in the optical network (i.e., in the OAN);

the WA with the functions of an RNC/BSC is arranged in the optical network and no RGW exists;

the WA with the functions of an RNC and a Serving GPRS Support Node (SGSN) is arranged in the optical network and no RGW exists;

the BS, WA and RGW are arranged in the optical network and the functions of the BS, WA and RGW are defined in Table 1, the WA can further be moved down to the BS to ensure satisfactory communication performance in the radio communication network and to optimize the interface between the BS and the RNC:

TABLE 1

| Function | BS | WA (functions moved down) | RGW |
|---|---|---|---|
| Physical layer (PHY) | Mandatory | | |
| Media Access Control (MAC) | | Mandatory | |
| Radio Link Control (RLC) | | Mandatory | |
| Broadcast/Multicast Control (BMC) | | Optional | |
| Packet Data Convergence Protocol (PDCP) | | Mandatory | |
| Radio Resource Control (RRC) | | | |
| Multi-Cell Radio Resource Management (MC-RRM) | | | Optional |
| Cell Specified Radio Resource Management (CS-RRM) | | Mandatory | |
| Broadcast Distribution | | | Mandatory |
| Handover (HO) Control | | Mandatory | |
| Paging Control | | | Optional |
| Admission Control | | Optional | |
| Cell Control | | Optional | |
| Multi-Cell Control | | | Optional |
| Relocation Control | | | Mandatory |
| QoS Allocation | | Optional | |
| RANAP Message Forwarding | | | Optional |
| RNSAP Message Forwarding | | | Optional |
| Handover Control between the Cable Access and the Radio Access | | | Optional |

Based on the function definitions of the BS, WA and the RGW in the RAN, an embodiment is as follows.

The functions of a RAN consisting of BSs and RNCs are divided into two network elements: an RGW element and an element including the BS and the WA (BS+WA element). The WA and the RGW together performs all the functions of the RNCs in the conventional radio communication network; and A part of the radio interface protocol functions in the Radio Network Layer (RNL) protocol stack, e.g., a part of the RRC and PDCP or BMC or RLC or MAC, are moved down to the WA of the base station, (e.g., Node B, BS); the RGW provides a function of adapting the interconnection system structure to the Core Network (CN) or RNC elements in the conventional radio communication network structure, and functions of the relocation of the BS+WA element, multi-cell radio resource management, broadcast distribution and paging control, and RANAP or RNSAP message forwarding. The connection between the BS+WA element and the RGW can be arranged in a multiple- to-multiple pattern so that the networking flexibility of the interconnection system between the radio communication network and the optical network is greatly improved.

Figure 1:
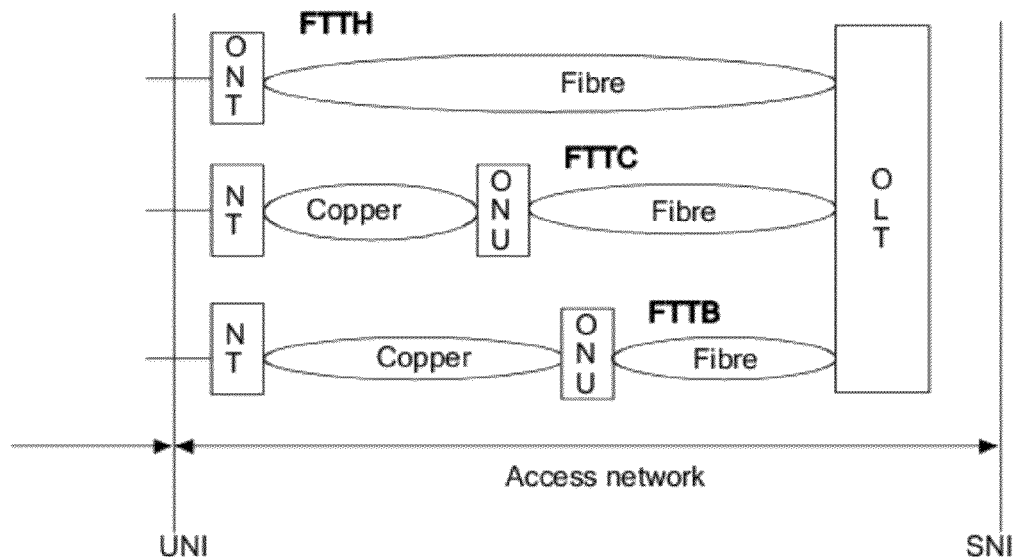
FIG. 1 is a schematic of the basic network structure of an optical access network.
Figure 2:
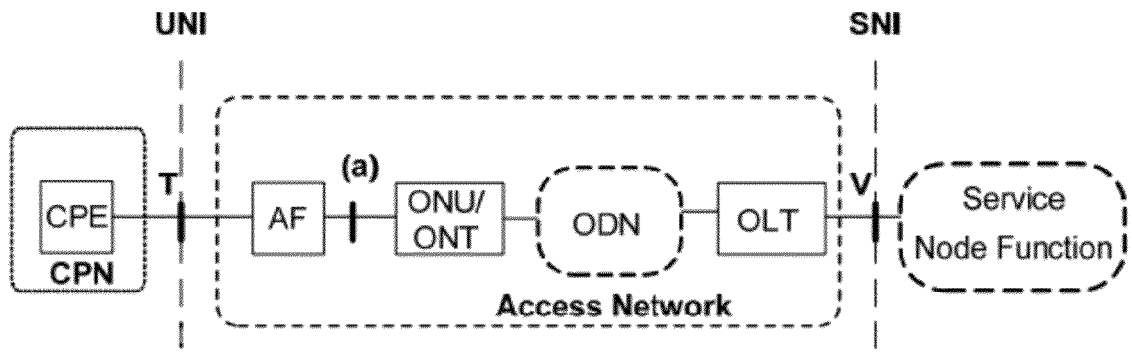
FIG. 2 is a schematic of a reference structure of an OAN.
Figure 3:
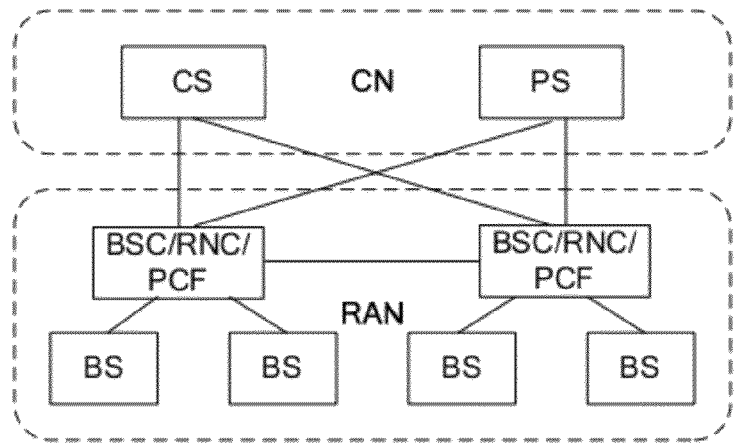
FIG. 3 is a schematic of a reference structure of a 3G or 2G network system.
Figure 4:
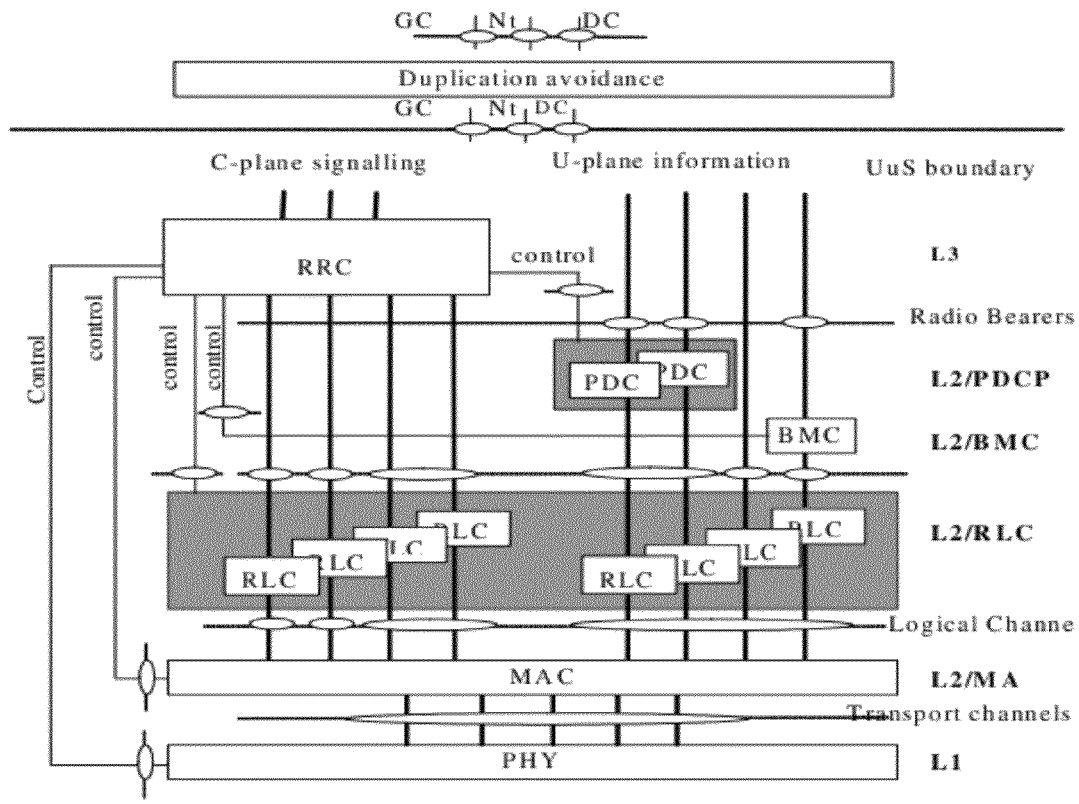
FIG. 4 is a schematic of architecture of radio interface protocol stack.
Figure 5:
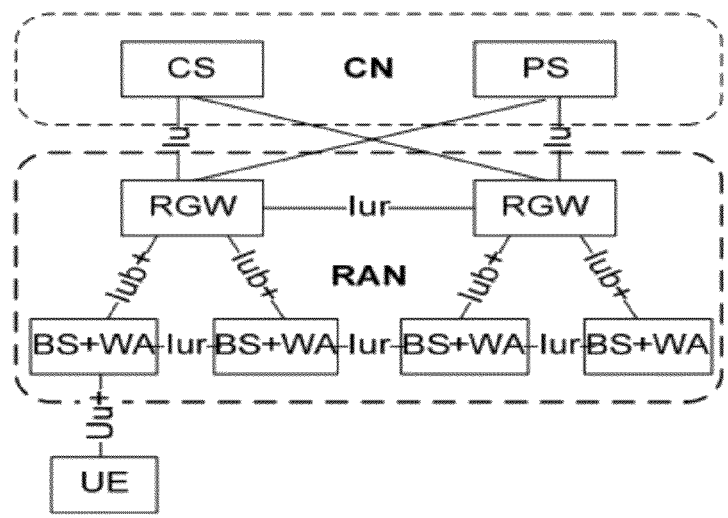
FIG. 5 is a schematic of a mobile network structure in which the radio interface function moves down.

FIG. 5 shows the radio communication network structure based on the function definitions of the elements including the RNCs, and the definitions of the interfaces in FIG. 5 are given as follows.

Uu+ interface between the UE element and the BS+WA element employs the Uu interface between the UE and UTRAN in the conventional radio communication network, and the Iub interface between the Node B and the RNC no longer exists.

Figure 6:
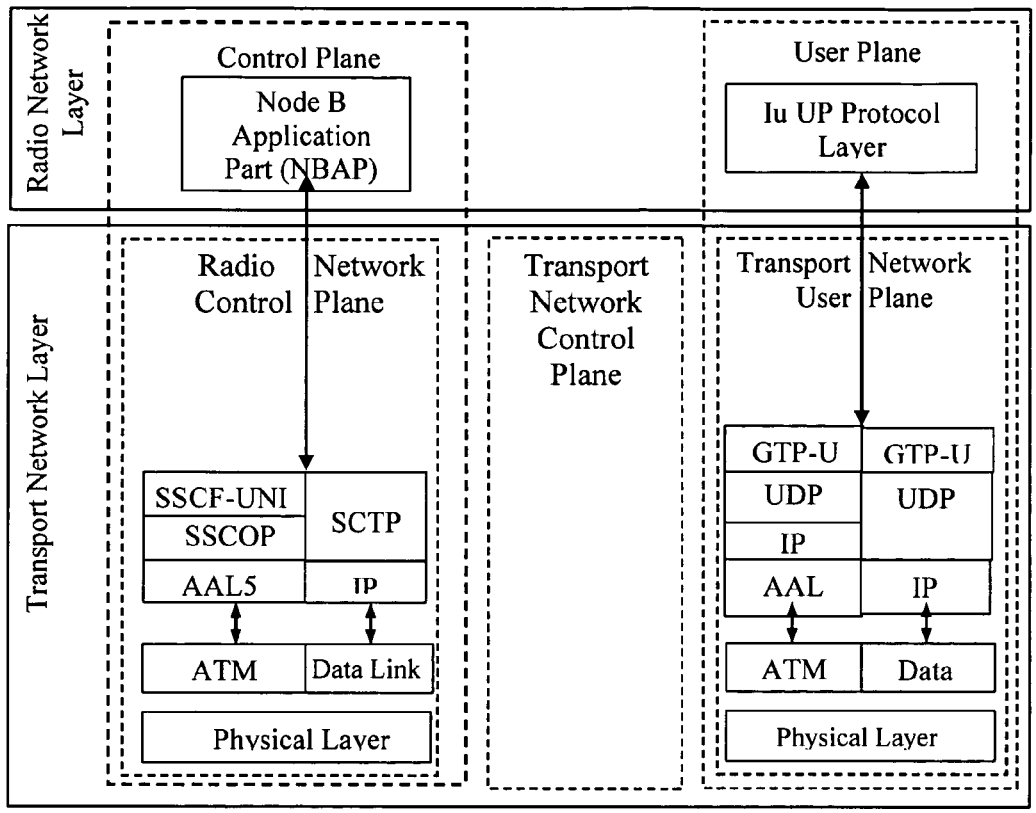
FIG. 6 is a schematic of the protocol structure of the PS domain Iub+ interface in FIG. 5.

Iub+ interface between the BS+WA element and the RGW employs the user plane of the Iu interface between the RNC and the SGSN in the conventional radio communication network on the user plane and employs the control plane of the Iu interface between the Node B and the RNC in the conventional radio communication network on the control plane; corresponding Iub+ interface protocol structure in the PS domain is shown in FIG. 6.

The interface between the RGW and the conventional CN employs the Iu interface between the RNC and the SGSN in the conventional radio communication network; the interface between two RGWs employs the Iur interface between two RNCs in the conventional radio communication network; and the interface between two newly added BS+WA elements also employs the Iur interface between two RNCs in the conventional radio communication network.

FIGS. 7a and 7b show the enhanced mobile network interface protocol stack in an embodiment in which the radio interface function moves down (i.e., the WA moves down to the base station). Corresponding radio communication network, which is built on the basis of such protocol stack and in which corresponding radio access function has moved down, is thus capable of user plane data transmission and control plane signaling transmission.

The second type: In a GSM network in which no RGW exists, the WA may be arranged in any of the following patterns.

No WA exist in the optical network;

the WA is arranged in the optical network and has the functions of BSC;

the WA is arranged in the optical network and has the functions of BSC and MSC.

Third type. In a CDMA2000 network in which no RGW exists, the WA may be arranged in any of the following patterns.

No WA exists in the optical network;

the WA is arranged in the optical network and functions as the BSC;

the WA is arranged in the optical network and has the functions of BSC and PCF or the functions of BSC and MSC.

Fourth type. In an IS-95 network in which no RGW exists, the WA may be arranged in any of the following patterns.

No WA exists in the optical network;

the WA is arranged in the optical network and functions as the BSC;

the WA is arranged in the optical network and has the functions of BSC and MSC.

The embodiments of the methods provided by the present disclosure for interconnection between the optical network and the radio communication network are described hereinafter with reference to the accompanying drawings.

FIGS. 8 to 10 show embodiments of the first method provided by the present disclosure for interconnection between an OAN and a radio communication network.

The BS or WA in a 3G or 2G radio communication network is connected via the AF to an OAN at a reference point (a) in the OAN, and the RGW or CN of the 3G or 2G radio communication network is connected to an OLT at a reference point v. In the embodiments the original OAN resources are fully utilized during the deployment of the 3G or 2G access network, e.g., when an operator has already had an FTTB/FTTC network, the 3G or 2G radio communication network devices may directly utilize corresponding resources in buildings to access the OAN through ONUs and thus reduce unnecessary wiring for the radio communication network and lower the construction cost of the 3G or 2G access network. The embodiments all adopt tight coupling in the application.

In the embodiments the BS, WA and AF can be different network elements interconnected at the reference point T; or the BS and the WA are integrated into one element and the BS+WA element and the AF are can be different network elements interconnected at the reference point T; or the BS, WA and AF are integrated into one network element. The RGW can be integrated with the OLT or be a standalone entity.

FIGS. 8 to 10 show the interconnection system in different patterns in the WCDMA system.

In Pattern 1, no WA or RGW exists; the interconnection system model of Pattern 1 is shown in FIG. 8, the RNC of the radio communication network is arranged in the CN.

In Pattern 2, no RGW exists when the WA is equal to the RNC; FIG. 9 shows the system model in such pattern; the CN does not include the RNC function In Pattern 3, no RGW exists when the WA is equal to the RNC+SGSN; FIG. 9 also shows the system model in such pattern; the CN does not include the RNC and SGSN functions.

In Pattern 4, the RNC is divided into WA and RGW functions shown in Table 1; the interconnection system model in Pattern 4 is shown in FIG. 10; the CN does not include the RNC function.

The protocol stacks on the path from a User Equipment (UE) to the Core Network (CN), i.e., UE->Node B->ONU->OLT->CN, and corresponding signal transmission and processing procedure in different patterns are explained hereinafter with reference to FIGS. 11 to 14.

The protocol information involved In FIGS. 6, 7 and 11 to 14 and illustrations of the interface protocol stacks in different patterns described below are only examples offered in the embodiments, and in practical applications the present disclosure is not limited to the protocols shown in the drawings.

I. Protocol Stack in Pattern 1 and Corresponding Signal Processing Procedure.

As shown in FIGS. 11 to 14, no WA exists in Pattern 1 and the CN in Pattern 1 includes the RNC, SGSN and Gateway GPRS Support Node (GGSN); and in the WCDMA, the UE is the Mobill Station (MS), the SGSN and the GGSN in the CN can be integrated into a new element: Integrated GPRS Support Node (IGSN). The Radio Network Layer (RNL) includes the PDCP, RLC and MAC on the user plane and the RRC, RLC and MAC on the control plane.

The procedure performed by the UE in the data communication on the basis of the protocol stack structures shown in FIGS. 11 and 12 includes the following steps.

First, the UE establishes an RRC connection via the control plane protocol stack and begins to establish a Radio Access Bearer (RAB) after negotiating with the CN, The RAB establishment procedure is associated with the user plane Radio Bearer (RB) establishment procedure.

When the RAB has been successfully established, a user can transmit data on the established user plane bearer, and the compression or decompression function of the PDCP can be activated or inactivated in the procedure.

Corresponding signaling establishment procedure on the control plane begins when the RRC connection between the UE and the UTRAN is successfully established. The UE establishes a signaling connection to the CN through the RNC in a "Non Access Stratum (NAS) signaling establishment procedure", and the signaling connection is used for NAS signaling interaction between the UE and the CN for the NAS information, e.g., the authentication, service request, connection establishment.

The user plane data transmission procedure in which the compression or decompression function is activated is described as follows.

The user plane data transmission and processing procedure on the uplink includes the following steps.

As shown in FIGS. 11 and 12, the application layer data of the UE is encapsulated into an IP packet or PPP packet and sent to the PDCP layer of the RNL. The PDCP layer compresses the headers of the data packet and sends the compressed data packet to the layer of RLC/MAC of the RNL. The RLC/MAC layer receives and processes the data packet, adds RLC/MAC header into the data packet and sends the data packet to the WCDMA physical layer, i.e., Radio Frequency Layer (RFL); the physical layer codes and modulates the data packet and sends the data packet to the UTRAN via the Uu interface.

The WCDMA physical layer RFL of the Node B in the UTRAN receives the data packet, encapsulates the data packet into Framing Protocol (FP) frames, and sends the FP frames to the RNC via the Iub interface.

The FP of the Iub interface between the Node B and the RNC can be borne by the OAN directly; layer-2 bridge, e.g., Ethernet bridge, can be used between the RNC and the Node B, and in such a case the AF, ONU or ONT and OLT are all layer-2 elements; or, layer-3 routing technique, IP layer-3 routing technique, can be used between the RNC and the Node B, and in such a case the AF, ONU or ONT and OLT are all layer-3 elements.

The Node B divides the FP or IP packet into Data Link Layer (LNK) frames and sends the LNK frames to the AF over the physical layer between the Node B and the AF. The AF converts the LNK frames into ONU LNK frames and sends the ONU LNK frames to the ONU or ONT over the physical layer between the ONU or ONT and the AF. The ONU or ONT converts the ONU or ONT LNK frames into ODN LNK frames which are suitable for optical transmission, performs electro-optic conversion, has the ODN physical layer bear the ODN LNK frames and eventually sends the frames to the OLT over fiber. The OLT PHY performs optic-electro conversion to retrieve the ODN LNK frames, converts the ODN LNK frames into LNK frames and sends the LNK frames to the RNC for further processing.

The RNC obtains the RNL frames from the FP layer of the Iub interface and sends the RNL frames to the MAC/RLC layer of the RNL. The MAC/RLC layer removes the protocol headers one by one, reorganizes and combines the data packet and sends the data packet to the PDCP of the RNL. The PDCP decompresses the compressed packet headers to obtain the data packet of the UE, performs the radio network layer and transport network layer processing of the Iu interface for the data packet, and sends the data packet to an element in the CN over the GTP tunnel. The Iu interface is the interface between the RNC and the SGSN, and the Gn interface is the interface between the SGSN and the GGSN.

In the CN, the IGSN performs the transport network layer and radio network layer processing of the Iu interface, receives the data IP packet or PPP packet of the UE from the GTP tunnel, and the IGSN sends the data in the format of IP packet or PPP packet to an external network. Alternatively, the SGSN performs the transport network layer and radio network layer processing of the Iu interface, receives data from the GTP tunnel and sends the data to the GGSN via the GTP tunnel through the Gn interface. The data received by the GGSN is the IP packet or PPP packet of the UE and sends the data in the format of IP packet or PPP packet to an external network via the Gi interface.

The user plane data processing procedure on the downlink is similar to the user plane processing procedure on the uplink, the difference is that the PDCP in the RNC compresses the headers of the data on the downlink and the PDCP in the UE decompresses the headers of the data on the downlink. When the compression function is inactivated, the signal processing procedures on the uplink and on the downlink are the same.

The protocol stack employed in the control plane signaling transmission and processing procedure in Pattern 1 is shown in FIGS. 13 and 14. On the basis of the corresponding protocol stack structure, the processes of the control plane signaling transmission procedure are quite obvious and are not described in detail.

II. Protocol Stacks in Pattern 2 and Corresponding Signal Processing Procedure.

With reference to FIG. 9, the differences between Pattern 1 and Pattern 2 include that, in Pattern 2, the WA functions as the RNC, the CN includes the SGSN and GGSN and the SGSN and GGSN may be integrated into an IGSN element.

The user plane data transmission procedure of Pattern 2 in which the compression/decompression function is activated is described as follows.

The user plane data transmission on the uplink in Pattern 2 is shown in FIGS. 15 and 16.

The application layer data of the UE is encapsulated into an IP or PPP packet and sent to the PDCP of the RNL. The PDCP compresses the data packet headers and sends the compressed data packet to the RCL/MAC of the RNL. The RCL/MAC layer processes the data packet, adds RCL/MAC headers into the data packet and sends the data packet to the WCDMA physical layer RFL.

The physical layer RFL codes and modulates the data packet and sends the data packet to the UTRAN via the Uu interface. The WCDMA physical layer RFL of the Node B+WA element in the UTRAN receives the data packet and sends the data packet to the MAC/RLC layer of the RNL. The MAC/RLC layer of the RNL removes the protocol headers of the data packet one by one, reorganizes and combines the data packet, and sends the data packet to the PDCP of the RNL. The PDCP decompresses the compressed data packet headers. When the compression function is inactivated, the process of compressing or decompressing shall be omitted.

The Node B+WA element sends the decompressed data through the GTP tunnel to the CN via the Iu interface. The GTP tunnel protocol, UDP and IP of the Iu interface between the WA and the CN can be borne directly on the OAN. Layer-2 bridge, such as Ethernet bridge, may be employed in the OAN between the WA and the CN, and in such a case the AF, ONU or ONT and OLT are all layer-2 elements. Alternatively, layer-3 routing technique, such as IP layer-3 routing technique, may be employed in the OAN between the WA and the CN, and in such a case the AF, ONU or ONT and OLT are all layer-3 elements.

The procedure for sending user plane data from the Node B+WA element to the CN is as follows.

The Node B+WA divides the GTP/UDP/IP packet into LNK frames and sends the LNK frames to the AF over the physical layer between the Node B+WA element and the AF. The AF converts the LNK frames into ONU LNK frames and sends the ONU LNK frames to the ONU or ONT over the physical layer between the ONU or ONT and the AF. The ONU or ONT converts the ONU or ONT LNK frames into ODN LNK frames which are suitable for optical transmission, performs electro-optic conversion, has the ODN physical layer bear the ODN LNK frames and eventually sends the ODN LNK frames to the OLT over fiber; The OLT PHY performs optic-electro conversion to retrieve the ODN LNK frames, converts the ODN LNK frames into LNK frames and sends the LNK frames to an element in the CN for further processing.

In the CN, the IGSN performs the transport network layer and radio network layer processing of the Iu interface; receives the data in the IP packet or PPP packet of the UE from the GTP tunnel, and the IGSN sends the data in the format of IP packet or PPP packet to an external network. Alternatively, the SGSN performs the transport network layer and radio network layer processing of the Iu interface, receives the data from the GTP tunnel and sends the data to the GGSN via the GTP tunnel through the Gn interface. The GGSN receives the data in the IP packet or PPP packet of the UE, from the GTP tunnel of the Gn interface and sends the data in the format of IP packet or PPP packet to an external network via the Gi interface.

The user plane data processing procedure on the downlink in Pattern 2 is similar to the user plane processing procedure on the uplink, the difference is that the PDCP in the Node B+WA element compresses the headers of the data on the downlink and the PDCP in the UE decompresses the headers of the data on the downlink. When the compression function is inactivated, the signal processing procedures on the uplink and on the downlink are the same.

The protocol stack employed in the control plane signaling transmission and processing procedure in Pattern 2 is shown in FIGS. 17 and 18. On the basis of the corresponding protocol stack structure, the processes of the control plane signaling transmission procedure are quite obvious and will not be described in detail.

III. Protocol Stack in Pattern 3 and Corresponding Signal Processing Procedure.

With reference to FIGS. 19 to 22, the differences between Pattern 3 and Pattern 1 include that, in Pattern 3, the WA equals the RNC+SGSN and the CN includes the GGSN which is shown in the drawings as the IGSN. FIG. 19 shows the protocol stack in Pattern 3 in which the BS and WA are integrated into one element and the element is separated from the AF on the user plane. FIG. 20 shows the protocol stack in Pattern 3 in which the BS, WA and AF are integrated into one element on the user plane. FIGS. 21 and 22 show corresponding structures of protocol stack on the control plane in Pattern 3.

The user plane data transmission procedure in Pattern 3 in which the compression/decompression function is activated is described as follows.

The user plane data transmission and processing procedure on the uplink is as follows.

The application layer data of the UE are encapsulated into an IP packet or PPP packet and sent to the PDCP layer of the RNL. The PDCP layer compresses the headers of the data packet and sends the compressed data packet to the RLC/MAC of the RNL. The RLC/MAC layer receives and processes the data packet, adds RLC/MAC header into the data packet and sends the data packet to the WCDMA physical layer RFL. The physical layer codes and modulates the data packet and sends the data packet to the UTRAN via the Uu interface.

The WCDMA physical layer RFL of the Node B+WA element (i.e., the BS+WA element) in the UTRAN receives the data and sends the data to the MAC/RLC layer of the RNL. The MAC/RLC layer removes the protocol headers of the data one by one, reorganizes and combines the data packet and sends the data packet to the PDCP of the RNL. The PDCP decompresses the compressed data packet headers.

The Node B+WA element sends the decompressed data through the GTP tunnel to the CN via the Gn interface. The GTP tunnel protocol, UDP and IP of the Gn interface between the WA and the CN can be borne directly on the OAN. Layer-2 bridge, such as Ethernet bridge, may be employed in the OAN between the WA and the CN and in such a case the AF, ONU or ONT and OLT are all layer-2 elements. Alternatively, layer-3 routing technique, such as IP layer-3 routing technique, may be employed in the OAN between the WA and the CN, and in such a case the AF, ONU or ONT and OLT are all layer-3 elements.

The procedure of sending user plane data from the Node B+WA element to the CN is as follows.

The Node B+WA element divides the GTP/UDP/IP packet into LNK frames and sends the LNK frames to the AF over the physical layer between the Node B+WA element and the AF. The AF converts the LNK frames into ONU LNK frames and sends the ONU LNK frames to the ONU or ONT over the physical layer between the ONU or ONT and the AF. The ONU or ONT converts the ONU or ONT LNK frames into ODN LNK frames which are suitable for optical transmission, performs electro-optic conversion, has the ODN physical layer bear the ODN LNK frames and eventually sends the ODN LNK frames to the OLT over fiber. The OLT PHY performs optic-electro conversion to retrieve the ODN LNK frames, converts the ODN LNK frames into LNK frames and sends the LNK frames to an element in the CN for further processing.

In the CN, the GGSN performs the transport network layer and radio network layer processing of the Gn interface, receives the data in the IP packet or PPP packet of the UE, from the GTP tunnel of the Gn interface and sends the data in the format of IP packet or PPP packet to an external network.

The user plane data processing procedure on the downlink in Pattern 3 is similar to the user plane processing procedure on the uplink, the difference is that the PDCP in the Node B+WA element compresses the headers of the data on the downlink and the PDCP in the UE decompresses the headers of the data on the downlink.

The protocol stack employed in the control plane signaling transmission and processing procedure in Pattern 3 is shown in FIGS. 21 and 22. On the basis of the protocol stack structure, the processes of the control plane signaling transmission procedure are quite obvious and are not described in detail.

IV. Protocol Stack in Pattern 4 and Corresponding Signal Processing Procedure.

The protocol stack on the user plane is shown in FIGS. 23 and 24 and the protocol stack on the control plane is shown in FIGS. 25 and 26. The divided functions definitions of the WA and the RGW are shown in Table 1. The CN includes the SGSN and the GGSN which can be standalone elements or be integrated into one IGSN element.

The user plane data transmission and processing procedure in Pattern 4 in which the compression/decompression function is activated is described as follows.

The procedure on the uplink in Pattern 4 is as follows.

With reference to FIGS. 23 and 24, the application layer data of the UE are encapsulated into an IP packet or PPP packet and sent to the PDCP layer of the RNL. The PDCP layer compresses the headers of the data packet and sends the compressed data to the RLC/MAC of the RNL. The RLC/MAC layer receives and processes the data packet, adds RLC/MAC header into the data packet and sends the data packet to the WCDMA physical layer RFL. The physical layer RFL codes and modulates the data packet and sends the data packet to the UTRAN via the Uu+ interface.

The WCDMA physical layer RFL of the BS+WA element in the UTRAN receives the data and sends the data to the MAC/RLC layer of the RNL. The MAC/RLC layer removes the protocol headers of the data one by one, reorganizes and combines the data packet and sends the data to the PDCP of the RNL. The PDCP decompresses the compressed data packet headers.

The BS+WA element sends the decompressed data through the GTP tunnel to RGW via the Iub+ interface and further to the CN. The GTP tunnel protocol, UDP and IP of the Iu interface between the WA and the RGW can be borne directly on the OAN. Layer-2 bridge, such as Ethernet bridge, may be employed in the OAN between the WA and the RGW and in such a case the AF, ONU or ONT and OLT are all layer-2 elements. Alternatively, layer-3 routing technique, such as IP layer-3 routing technique, may be employed in the OAN between the RNC and the Node B, and in such a case the AF, ONU or ONT and OLT are all layer-3 elements.

Accordingly, the user plane data transmission from the BS+WA element to the CN is as follows.

The BS+WA element divides the GTP/UDP/IP packet into LNK frames and sends the LNK frames to the AF over the physical layer between the Node B and the AF. The AF converts the LNK frames into ONU LNK frames and sends the ONU LNK frames to the ONU or ONT over the physical layer between the ONU or ONT and the AF. The ONU or ONT converts the ONU or ONT LNK frames into ODN LNK frames which are suitable for optical transmission, performs electro-optic conversion, has the ODN physical layer bear the ODN LNK frames and eventually sends the ODN LNK frames to the OLT over fiber. The OLT PHY performs optic-electro conversion to retrieve the ODN LNK frames, converts the ODN LNK frames into LNK frames and sends the LNK frames to the RGW for further processing. The RGW receives the data from the GTP tunnel of the Iub+ interface, performs the radio network layer and transport network layer processing of the Iu interface and sends the data packet to an element in the CN through the GTP tunnel.

In the CN, the SGSN performs the radio network layer and transport network layer processing of the Iu interface, receives data from the GTP tunnel and sends the data to the GGSN through the GTP tunnel via the Gn interface. The GGSN receives data in the IP packet or PPP packet of the UE from the GTP tunnel of the Gn interface and sends the data in the format of IP packet or PPP packet to an external network via the Gi interface.

The user plane data processing procedure on the downlink in Pattern 4 is similar to the user plane processing procedure on the uplink, the only difference is that the PDCP in the BS+WA element compresses the headers of the data on the downlink and the PDCP in the UE decompresses the headers of the data on the downlink.

The control plane signaling transmission procedure in Pattern 4 is described hereafter.

With reference to FIGS. 25 and 26, the control plane signaling transmission and processing procedure on the uplink includes the followings.

The RRC of the UE encapsulates the GPRS Mobile Management (GMM)/Session Management (SM)/Short Message Service (SMS) messages or signaling message of the layer into data packet and sends the data packet to the RLC/MAC of the RNL. The RLC/MAC layer receives and processes the data packet, adds RLC/MAC headers into the data packet and sends the data packet to the WCDML physical layer RFL. The physical layer codes and modulates the data packet and sends the data packet to the UTRAN via the Uu+ interface.

The WCDMA physical layer RFL of the BS+WA element in the UTRAN receives the data packet and sends the data packet to the MAC/RLC layer of the RNL. The MAC/RLC layer removes the protocol headers of the data packet one by one, reorganizes and combines the data packet and sends the data packet to the RRC layer of the RNL. The RRC layer usually parses the corresponding signaling message directly and performs corresponding actions, i.e., connection establishment, check report. However, the RRC of the BS+WA element sends the signaling messages corresponding to relocation of the BS+WA element, multi-cell radio resource management, broadcast distribution, paging control and RANAP/RNSAP message forwarding to the RRC layer of the RGW over the Iub+ interface radio network layer (e.g., FP) and transport layer (e.g., IP/LNK/PHY). The RGW forwards the signaling messages to the CN for further processing.

The RRC, radio network layer (e.g., FP or NBAP) and transport network layer (e.g., IP layer or signaling bearer [e.g., the Stream Control Transport Protocol (SCTP)/IP]) of the Iub+ interface between the WA and the RGW may be borne directly on the OAN. Layer-2 bridge, such as Ethernet bridge, may be employed in the OAN between the WA and the RGW, and in such a case the AF, ONU or ONT and OLT are all layer-2 elements. Alternatively, layer-3 routing technique, such as IP layer-3 routing technique, may be employed in the OAN between the WA and the RGW, and in such a case, the AF, ONU or ONT and OLT are all layer-3 elements.

The control signaling forwarding from the BS+WA element to the CN is as follows.

The BS+WA element divides the Iub+ interface's FP/IP packet or NBAP/SCTP/IP packet into LNK frames and sends the LNK frames to the AF over the physical layer between the Node B and the AF. The AF converts the LNK frames into ONU LNK frames and sends the ONU LNK frames to the ONU or ONT over the physical layer between the ONU or ONT and the AF. The ONU or ONT converts the ONU or ONT LNK frames into ODN LNK frames which are suitable for optical transmission, performs electro-optic conversion, has the ODN physical layer bear the frames and eventually sends the ODN LNK frames to the OLT over fiber. The OLT PHY performs optic-electro conversion to retrieve the ODN LNK frames, converts the ODN LNK frames into LNK frames and sends the LNK frames to the RGW for further processing. The RGW performs the transport network layer and radio network layer processing of the Iub+ interface, retrieves the RNL frames of the RRC from the FP and sends the RNL frames to the MAC/RLC layer of the RNL. The MAC/RLC layer removes the protocol headers of the data packet one by one, reorganizes and combines the data packet and sends the data packet to the RRC. The RRC layer decompresses the compressed data packet headers to retrieve the data packet, and sends the data packet to a network element in the CN after the radio network layer and transport network layer of the Iu interface have processed the packet.

In the CN, the IGSN/SGSN performs the transport network layer and radio network layer processing of the Iu interface to retrieve the GMM/SM/SMS messages from the RANAP.

Similarly, the UE receives the signaling messages of the CN and the RRC signaling messages of the AN in a procedure on the opposite direction, i.e., the UE receives the signaling messages from the CN in a similar procedure on the downlink.

In the protocol stack processing model, the functions of the RRC layer are implemented by the RGW and the WA in the base station. The functions including fast connection establishment, fast feedback and resource allocation are provided by the WA in the base station and the functions such as data management, data storage and the processing related to multiple base stations are provided by the RGW. In this way, a part of the RNC functions are moved down to the base station.

FIGS. 27 to 29 show embodiments of the second method provided by the present disclosure for interconnecting an OAN and a radio communication network.

The BS or WA of a 3G or 2G radio communication network is connected to an OAN broadband network at an ODN. The RGW or CN of the 3G or 2G radio communication network is connected to an OLT at a reference point v. The method employs tight coupling. The 3G or 2G radio communication network utilizes the optical network resources of the OAN directly, e.g., multiplexes the existing FTTH network of the operator or WiMAX devices in the radio communication network to be connected to the ODN directly in buildings.

In this method, the BS is required to have the functions of the ONU or ONT, or the BS, WA and the ONU or ONT are integrated into one element. The RGW and the OLT may be integrated into one element.

FIGS. 27 to 29 show the interconnection system in different patterns in the WCDMA system.

If neither the WA nor the RGW exists, the interconnection system model is shown in FIG. 27, and the RNC is arranged in the CN.

If the WA is equal to the RNC and no RGW exists, the interconnection system model is shown in FIG. 28, and the CN does not include the RNC.

If the WA is equal to the RNC plus the SGSN and no RGW exists, the interconnection system model is shown in FIG. 28, and the CN does not include the RNC or the SGSN.

If functions of the WA and the RGW are divided as shown in Table 1, the interconnection system model is shown in FIG. 29, and the CN does not include the RNC because the RNC is divided into different elements in the OAN.

FIGS. 30 to 39 show the protocol stacks on the path UE->Node B->ONU->OLT->CN in different patterns. The protocol stacks and signal transmission and processing procedures in different patterns of the second method are described hereafter.

Protocol stack in Pattern 1 and corresponding signal transmission and processing procedure.

With reference to FIG. 27, in Pattern 1, no WA exists and the CN includes the RNC, SGSN and GGSN. The MS is called the UE in the WCDMA and the SGSN and GGSN may be integrated into a new IGSN element.

The user plane data transmission procedure in Pattern 1 in which the compression/decompression function is activated is described as follows with reference to the accompanying drawings.

With reference to FIG. 30, the user plane data transmission and processing procedure on the uplink in Pattern 1 is as follows.

The application layer data of the UE are encapsulated into an IP packet or PPP packet and sent to the PDCP layer of the RNL. The PDCP layer compresses the headers of the data packet and sends the compressed data packet to the RLC/MAC of the RNL. The RLC/MAC layer receives and processes the data packet, adds RLC/MAC header into the data packet and sends the data packet to the WCDMA physical layer RFL. The physical layer codes and modulates the data packet and sends the data packet to the UTRAN via the Uu interface.

The UTRAN WCDMA physical layer RFL, including the Node B and the ONU or ONT, receives the data, encapsulates the data into Framing Protocol (FP) frames, and sends the FP frames to the RNC in the CN via the Iub interface.

The Iub interface FP between the Node B and the RNC may be borne by the OAN directly Layer-2 bridge, such as Ethernet bridge, may be used between the RNC and the Node B, and in such a case the AF, ONU or ONT and OLT are all layer-2 elements. Alternatively, layer-3 routing technique, such as IP layer-3 routing technique, may be used between the RNC and the Node B, and in such a case the AF, ONU or ONT and OLT are all layer-3 elements.

The user plane data transmission from the element including the Node B and the ONU or ONT to the CN is as follows.

The Node B+ONU or ONT element divides the FP/IP packet into ODN LNK frames which are suitable for optical transmission, performs electro-optic conversion, has the ODN physical layer bear the ODN LNK frames and eventually sends the ODN LNK frames to the OLT over fiber. The OLT PHY performs optic-electro conversion to retrieve the ODN LNK frames, converts the ODN LNK frames into LNK frames and sends the LNK frames to the RNC in the CN for further processing. The RNC obtains RNL frames from the FP layer of the Iub interface and sends the RNL frames to the MAC/RLC layer of the RNL. The MAC/RLC layer removes the protocol headers one by one, reorganizes and combines the data packet and sends the data packet to the PDCP of the RNL. The PDCP decompresses the compressed packet headers to obtain the data packet of the UE, performs the radio network layer and transport network layer processing of the Iu interface for the data packet, and sends the data packet over the GTP tunnel to another element in the CN, e.g., IGSN/SGSN.

In the CN, the IGSN performs the transport network layer and radio network layer processing of the Iu interface, the data received from the GTP tunnel is the IP packet or PPP packet of the UE, and the IGSN sends the data in the format of IP packet or PPP packet to an external network. Alternatively, the SGSN performs the transport network layer and radio network layer processing of the Iu interface, receives data from the GTP tunnel and sends the data to the GGSN via the GTP tunnel through the Gn interface. The GGSN receives data in the IP packet or PPP packet of the UE from the GTP tunnel of the Gn interface, and sends the data in the format of IP packet or PPP packet to an external network via the Gi interface.

The data transmission on the downlink is similar to the data transmission on the uplink. The difference is that the PDCP in the RNC compresses the data headers on the downlink and the PDCP in the UE decompresses the data headers on the downlink.

FIG. 31 shows the protocol stacks employed in the control plane signaling transmission and processing procedure in Pattern 1 of the second method provided by the present disclosure. On the basis of the protocol stack structure, the processes of the control plane signaling transmission procedure are quite obvious and will not be described in detail.

II. Protocol Stack Structure in Pattern 2 and Corresponding Signal Processing Procedure.

With reference to FIG. 28, the differences between Pattern 2 and Pattern 1 include that: in Pattern 2 the WA is equal to the RNC and the CN includes the SGSN and the GGSN, but not the RNC. The SGSN and the GGSN may be integrated into a new element IGSN, of which the protocol stack structure is shown in FIGS. 32 and 33.

The user plane data transmission procedure in Pattern 2 in which the compression/decompression function is also activated is described as follows.

With reference to FIG. 32, the user plane data transmission and processing procedure on the uplink in Pattern 2 is as follows.

The application layer data of the UE is encapsulated into an IP packet or PPP packet and sent to the PDCP layer of the RNL. The PDCP layer compresses the headers of the data packet and sends the compressed data to the RLC/MAC of the RNL. The RLC/MAC layer receives and processes the data packet, adds RLC/MAC header into the data packet and sends the data packet to the WCDMA physical layer RFL. The physical layer codes and modulates the data packet and sends the data packet to the UTRAN via the Uu interface.

The WCDMA physical layer RFL of the Node B+WA+ONU or ONT element (i.e., the element including the base station, the WA and the ONU or ONT) in the UTRAN receives the data and sends the data to the MAC/RLC layer of the RNL. The MAC/RLC layer removes the protocol headers of the data one by one, reorganizes and combines the data packet and sends the data packet to the PDCP of the RNL. The PDCP decompresses the compressed data packet headers.

The Node B+WA+ONU or ONT element sends the decompressed data through the GTP tunnel to the CN via the Iu interface. The GTP tunnel protocol, UDP and IP of the Iu interface between the WA and the CN can be borne directly on the OAN. Layer-2 bridge, such as Ethernet bridge, may be employed in the OAN between the WA and the CN, and in such a case the AF, ONU or ONT and OLT are all layer-2 elements. Alternatively, layer-3 routing technique, such as IP layer-3 routing technique, may be employed in the OAN between the WA and the CN, and in such a case the AF, ONU or ONT and OLT are all layer-3 elements.

Corresponding user plane data transmission and processing procedure from the Node B+WA+ONU or ONT element to the CN is as follows.

The Node B+WA+ONU or ONT element divides the GTP/UDP/IP packet into ODN LNK frames which are suitable for optical transmission, performs electro-optic conversion, has the ODN physical layer bear the ODN LNK frames and eventually sends the ODN LNK frames to the OLT over fiber. The OLT PHY performs optic-electro conversion to retrieve the ODN LNK frames, converts the ODN LNK frames into LNK frames and sends the LNK frames to an element in the CN for further processing.

In the CN, the IGSN performs the transport network layer and radio network layer processing of the Iu interface, receives the data, i.e., IP packet or PPP packet of the UE from the GTP tunnel, and sends the data in the format of IP packet or PPP packet to an external network. Alternatively, the SGSN performs the transport network layer and radio network layer processing of the Iu interface, receives data from the GTP tunnel and sends the data to the GGSN via the GTP tunnel through the Gn interface. The GGSN receives data, i.e., IP packet or PPP packet of the UE from the GTP tunnel of the Gn interface and sends the data in the format of IP packet or PPP packet to an external network via the Gi interface.

The user plane data processing procedure on the downlink is similar to the procedure on the uplink. The difference is that the PDCP in the Node B+WA+ONU or ONT element compresses the data headers on the downlink and the PDCP in the UE decompresses the data headers on the downlink.

Corresponding control plane signaling transmission and processing procedure is on the basis of the protocol stack structure shown in FIG. 33 and will not be described further.

III. Protocol Stack Structure in Pattern 3 and Corresponding Signal Processing Procedure.

With reference to FIG. 28, the WA in the drawing equals the RNC+SGSN and the CN includes the GGSN with similar functions as the IGSN shown in FIG. 25. The structures of the protocol stacks employs in the communication are shown in FIGS. 34 and 35.

The user plane data transmission procedure in Pattern 3 in which the compression/decompression function is activated is described as follows.

With reference to FIG. 34, the user plane data transmission and processing procedure on the uplink in Pattern 3 is as follows.

The application layer data of the UE are encapsulated into IP packet or PPP packet and sent to the PDCP layer of the RNL. The PDCP layer compresses the headers of the data packet and sends the compressed data to the RLC/MAC of the RNL. The RLC/MAC layer receives and processes the data packet, adds RLC/MAC header into the data packet and sends the data packet to the WCDMA physical layer RFL. The physical layer codes and modulates the data packet and sends the data packet to the UTRAN via the Uu interface.

The WCDMA physical layer RFL of the Node B+WA+ONU or ONT element in the UTRAN receives the data and sends the data to the MAC/RLC layer of the RNL. The MAC/RLC layer removes the protocol headers of the data one by one, reorganizes and combines the data packet and sends the data packet to the PDCP of the RNL. The PDCP decompresses the compressed data packet headers.

The Node B+WA+ONU or ONT element sends the decompressed data through the GTP tunnel to the CN via the Gn interface. The GTP tunnel protocol, UDP and IP of the Gn interface between the WA and the CN can be borne directly on the OAN. Layer-2 bridge, such as Ethernet bridge, may be employed in the OAN between the WA and the CN, and in such a case the AF, ONU or ONT and OLT are all layer-2 elements. Alternatively, layer-3 routing technique, such as IP layer-3 routing technique, may be employed in the OAN between the WA and the CN, and in such a case the AF, ONU or ONT and OLT are all layer-3 elements.

The procedure of sending user plane data from the Node B+WA+ONU or ONT element to the CN is as follows.

The Node B+WA+ONU or ONT element divides the GTP/UDP/IP packet into ODN LNK frames which are suitable for optical transmission, performs electro-optic conversion, has the ODN physical layer bear the ODN LNK frames and eventually sends the ODN LNK frames to the OLT over fiber. The OLT PHY performs optic-electro conversion to retrieve the ODN LNK frames, converts the ODN LNK frames into LNK frames and sends the LNK frames to an element in the CN for further processing.

In the CN, the GGSN performs the transport network layer and radio network layer processing of the Gn interface, receives data, i.e., IP packet or PPP packet of the UE from the GTP tunnel of the Gn interface and sends the data in the format of IP packet or PPP packet to an external network.

Corresponding user plane data processing procedure on the downlink is similar to the procedure on the uplink. The difference is that the PDCP in the Node B+WA+ONU or ONT element compresses the data headers on the downlink and the PDCP in the UE decompresses the data headers on the downlink.

Corresponding control plane signaling transmission and processing procedure in Pattern 3 is on the basis of the protocol stack structure shown in FIG. 35.

IV. Protocol Stack Structure in Pattern 4 and Corresponding Signal Processing Procedure.

The structures of the protocol stacks on the user plane in Pattern 4 are shown in FIGS. 36 and 37. The structures of the protocol stacks on the control plane in Pattern 4 are shown in FIGS. 38 and 39. Table 1 shows the definitions of the divided functions of the WA and the RGW. The WA and the RGW together achieve the functions of the RNC in the radio communication network. The CN includes the SGSN and the GGSN. The SGSN and GGSN may be integrated into a new element IGSN.

The user plane data transmission procedure in Pattern 4 in which the compression/decompression function is activated is described as follows.

With reference to FIGS. 36 and 37, the user plane data transmission on the uplink is as follows.

The application layer data of the UE is encapsulated into IP packet or PPP packet and sent to the PDCP layer of the RNL. The PDCP layer compresses the headers of the data packet and sends the compressed data to the RLC/MAC of the RNL. The RLC/MAC layer receives and processes the data packet, adds RLC/MAC header into the data packet and sends the data packet to the WCDMA physical layer RFL. The physical layer codes and modulates the data packet and sends the data packet to the UTRAN via the Uu+ interface.

The WCDMA physical layer RFL of the BS+WA+ONU or ONT element in the UTRAN receives the data packet and sends the data packet to the MAC/RLC layer of the RNL. The MAC/RLC layer removes the protocol headers of the data one by one, reorganizes and combines the data packet and sends the data packet to the PDCP of the RNL. The PDCP decompresses the compressed data packet headers.

The BS+WA+ONU or ONT element sends the decompressed data through the GTP tunnel to RGW via the Iub+ interface and further to the CN. The GTP tunnel protocol, UDP and IP of the Iu interface between the WA and the RGW can be borne directly on the OAN. Layer-2 bridge, such as Ethernet bridge, may be employed in the OAN between the WA and the RGW, and in such a case the OLT is a layer-2 element. Alternatively, layer-3 routing technique, such as IP layer-3 routing technique, may be employed in the OAN between the RNC and the Node B, and in such a case the OLT is a layer-3 element.

The procedure of sending user plane data from the BS+WA+ONU or ONT element to the CN is as follows.

The BS+WA+ONU or ONT element divides the GTP/UDP/IP packet into ODN LNK frames which are suitable for optical transmission, performs electro-optic conversion, has the ODN physical layer bear the ODN LNK frames and eventually sends the ODN LNK frames to the OLT over fiber. The OLT PHY performs optic-electro conversion to retrieve the ODN LNK frames, converts the ODN LNK frames into LNK frames and sends the LNK frames to the RGW for further processing. The RGW receives the data from the GTP tunnel of the Iub+ interface, performs the radio network layer and transport network layer processing of the Iu interface and sends the data packet to an element in the CN through the GTP tunnel.

In the CN, the SGSN performs the radio network layer and transport network layer processing of the Iu interface, receives data from the GTP tunnel and sends the data to the GGSN through the GTP tunnel via the Gn interface. The GGSN receives data, i.e., IP packet or PPP packet of the UE from the GTP tunnel of the Gn interface and sends the data in the format of IP packet or PPP packet to an external network via the Gi interface.

Corresponding user plane data processing procedure on the downlink is similar to the user plane data processing procedure on the uplink. The difference is that the PDCP in the BS+WA+ONU or ONT element compresses the data headers on the downlink and the PDCP in the UE decompresses the data headers on the downlink.

The control plane signaling transmission procedure in Pattern 4 is described hereinafter.

With reference to FIGS. 38 and 39, corresponding control plane data transmission on the uplink is as follows.

The RRC of the UE encapsulates the GMM/SM/SMS messages or signaling message of the layer into data packet and sends the data packet to the RLC/MAC of the RNL. The RLC/MAC layer receives and processes the data packet, adds RLC/MAC headers into the data packet and sends the data packet to the WCDML physical layer RFL. The physical layer codes and modulates the data packet and sends the data packet to the UTRAN via the Uu+ interface.

The WCDMA physical layer RFL of the BS+WA+ONU or ONT element in the UTRAN receives the data packet and sends the data packet to the MAC/RLC layer of the RNL. The MAC/RLC layer removes the protocol headers of the data packet one by one, reorganizes and combines the data packet and sends the data packet to the RRC layer of the RNL. The RRC layer usually parses the signaling message directly and performs corresponding actions, i.e., connection establishment, check report. However, the RRC of the BS+WA+ONU or ONT element sends the signaling messages corresponding to relocation of the BS+WA+ONU or ONT element, multicell radio resource management, broadcast distribution, paging control and RANAP/RNSAP message forwarding to the RRC layer of the RGW over the radio network layer (e.g., FP) and the transport layer (e.g., IP/LNK/PHY) of the Iub+ interface. The RGW forwards the signaling messages to the CN for further processing.

The RRC, radio network layer (e.g., FP or NBAP) and transport network layer (IP layer or signaling bearer [e.g., SCTP/IP]) of the Iub+ interface between the WA and the RGW can be borne by the OAN directly. Layer-2 bridge, such as Ethernet bridge, may be employed in the OAN between the WA and the RGW, and in such a case the OLT is a layer-2 element. Alternatively, layer-3 routing technique, such as IP layer-3 routing technique, may be used between the WA and the RGW, and in such a case the OLT is a layer-3 element.

Corresponding control signaling transmission from the BS+WA+ONU or ONT element to the CN is as follows.

The BS+WA+ONU or ONT element divides the Iub+ interface's FP/IP packet or NBAP/SCTP/IP packet into ODN LNK frames which are suitable for optical transmission, performs electro-optic conversion, has the ODN physical layer bear the ODN LNK frames and eventually sends the ODN LNK frames to the OLT over fiber. The OLT PHY performs optic-electro conversion to retrieve the ODN LNK frames, converts the ODN LNK frames into LNK frames and sends the LNK frames to the RGW for further processing. The RGW performs the transport network layer and radio network layer processing of the Iub+ interface, retrieves the RNL frames of the RRC from the FP and sends the RNL frames to the MAC/RLC layer of the RNL. The MAC/RLC layer removes the packet headers one by one, reorganizes and combines the data packet and sends the data packet to the RRC. The RRC layer decompresses the compressed data packet headers to retrieve the data packet, and sends the data packet to an element in the CN after the radio network layer and transport network layer of the Iu interface have processed the packet.

In the CN, the IGSN/SGSN performs the transport network layer and radio network layer processing of the Iu interface to retrieve the GMM/SM/SMS messages from the RANAP.

Similar to the control signaling transmission on the uplink, the control signaling transmission on the downlink includes: the UE receiving signaling messages from the CN and RRC signaling messages from the AN in a procedure on the opposite direction.

In the protocol stack processing model, the functions of the RRC layer are implemented by the RGW and the WA in the base station. The functions including fast connection establishment, fast feedback and resource allocation are provided by the WA in the base station, and the functions such as base station management, data storage and the processing related to multiple base stations are provided by the RGW. In this way, a part of the RNC functions are moved down to the base station through the WA and the interface between the RNC and the base station is optimized.

FIGS. 40 to 42 show embodiments of the third method provided by the present disclosure for interconnecting an OAN and a radio communication network.

In this method, the BS or BS and WA in a 3G/2G radio communication network is directly connected to the OAN broadband network at a reference point v. An OLT of the OAN broadband network is connected to the CN via a v interface. The method employs loose coupling, in which the access network of the radio communication network and the access network of the optical network are interconnected at the edge, i.e., at the reference point v, and the radio communication network and the optical network share the same CN. By this method, the services and application resources can be shared in the two networks. For example, authentication, billing and customer care and be unified in the CN. The interconnection system of this method is shown in FIGS. 40 to 42, in which the BS and the WA are integrated into one element.

FIGS. 43 to 52 show the protocol stack structures in different patterns of the third method for interconnecting in the WCDMA system. With reference to the descriptions above, there are different patterns as follows.

If neither the WA nor the RGW exists, the BS is directly connected to the reference point v of the OAN and the RNC may be in the CN; the reference system model in this pattern is shown in FIG. 40.

If the WA equals the RNC and no RGW exists, the WA and the BS shall be integrated into one element and the element is connected to the reference point v of the OAN; the reference system model in this pattern is shown in FIG. 41.

If when the WA equals the RNC plus the SGSN and no RGW exists, the WA and the BS shall be integrated into one element and the element is connected to the reference point v of the OAN; the reference system model in this pattern is shown in FIG. 41.

If when the divided functions of the WA and the RGW are defined as shown in Table 1, the BS and the WA shall be integrated into one element and the element shall be connected to the reference point v of the OAN, the element is also connected to the RGW and further to the CN; the reference system model in this pattern is shown in FIG. 42.

The structures of the protocol stacks in different patterns of this method are shown in FIGS. 43 to 52. The protocol stacks and signal transmission and processing procedures in different patterns of the third method are described hereinafter.

Protocol stacks in Pattern 1 and corresponding signal transmission and processing procedure.

With reference to FIG. 40, in Pattern 1, no WA or RGW exists and the CN includes the RNC, SGSN and GGSN. MS is called UE in the WCDMA. The SGSN and GGSN may be integrated into a new element IGSN.

The structures of the user plane protocol stack and control plane protocol stack on the OAN transmission path in Pattern 1, i.e., CPE->AF->ONU or ONT->OLT->CN, are shown in FIG. 43. The structure of the user plane protocol stack on the access network transmission path of the radio communication network, i.e., UE->Node B->RNC->IGSN, is shown in FIG. 44 and corresponding control plane protocol stack structure is shown in FIG. 45. The RNC has the cable/radio access handover control function, i.e., includes a module adapted to switch between cable access and radio access.

The user plane data transmission procedure in Pattern 1 in which the compression or decompression function is activated is described as follows.

With reference to FIG. 43, the user plane data transmission and processing procedure on the uplink of the optical network in Pattern 1 is as follows.

The CPE divides the user packet into LNK frames and sends the LNK frames to the AF over the physical layer between the CPE and the AF. The AF converts the LNK frames into ONU LNK frames and sends the ONU LNK frames to the ONU or ONT over the physical layer between the ONU or ONT and the AF. The ONU or ONT converts the ONU or ONT LNK frames into ODN LNK frames which are suitable for optical transmission, performs electro-optic conversion, has the ODN physical layer bear the ONU LNK frames and eventually sends the ONU LNK frames to the OLT over fiber. The OLT PHY performs optic-electro conversion to retrieve the ODN LNK frames, converts the ODN LNK frames into LNK frames and sends the LNK frames to the CN for further processing.

Corresponding data transmission on the downlink is similar to the data transmission on the uplink, though in the opposite direction.

In the optical network in Pattern 1, the control plane signaling transmission and processing procedure is on the basis of the protocol stack structure shown in FIG. 43, and the procedure is not described further.

With reference to FIG. 44, the user plane data transmission and processing procedure on the uplink of the radio communication network in Pattern 1 is as follows.

The application layer data of the UE is encapsulated into IP packet or PPP packet and sent to the PDCP layer of the RNL. The PDCP layer compresses the headers of the data packet and sends the compressed data to the RLC/MAC of the RNL. The RLC/MAC layer receives and processes the data packet, adds RLC/MAC header into the data packet and sends the data packet to the WCDMA physical layer RFL. The physical layer codes and modulates the data packet and sends the data packet to the UTRAN via the Uu interface.

The WCDMA physical layer RFL of the Node B in the UTRAN receives the data, encapsulates the data into FP frames, and sends the FP frames to the RNC in the CN via the Iub interface.

The RNC in the CN obtains the RNL frames from the FP layer of the Iub interface and sends the frames to the MAC/RLC layer of the RNL. The MAC/RLC layer removes the protocol headers one by one, reorganizes and combines the data packet and sends the data packet to the PDCP of the RNL, the PDCP decompresses the compressed packet headers to obtain the user packet, performs the radio network layer and transport network layer processing of the Iu interface for the data packet, and sends the data packet over the GTP tunnel to another element in the CN, e.g., IGSN/SGSN.

In the CN, the IGSN performs the transport network layer and radio network layer processing of the Iu interface. The data received from the GTP tunnel are the UE IP packet or PPP packet. The IGSN sends the data in the format of IP packet or PPP packet to an external network. Alternatively, the SGSN performs the transport network layer and radio network layer processing of the Iu interface, receives data from the GTP tunnel and sends the data to the GGSN via the GTP tunnel through the Gn interface. The data received by the GGSN from the GTP tunnel of the Gn interface are IP packet or PPP packet of the UE. The GGSN sends the data in the format of IP packet or PPP packet to an external network via the Gi interface.

In Pattern 1, corresponding user plane data processing procedure on the downlink of the radio communication network is similar to the data processing procedure on the uplink. The difference is that the PDCP in the RNC compresses the data headers on the downlink and the PDCP in the UE decompresses the data headers on the downlink.

In Pattern 1, the control plane signaling transmission and processing procedure of the radio communication network is on the basis of the protocol stack structure in FIG. 45, and the procedure will not be described further.

II. Protocol Stacks in Pattern 2 and Corresponding Signal Transmission and Processing Procedure.

The differences between Pattern 2 and Pattern 1 includes that: in Pattern 2, the WA equal the RNC and the CN includes the SGSN and the GGSN, but not the RNC; the SGSN and GGSN in the CN may be integrated into a new element IGSN.

In Pattern 2, the transmission path in the optical network, i.e., CPE->AF->ONU or ONT->OLT->CN, employs the protocol stack structure shown in FIG. 44 and the transmission path in the radio communication network, i.e., UE->Node B+RNC->IGSN, employs the protocol stack structure shown in FIGS. 46 and 47. The CN has the cable/radio access handover control function, i.e., includes a module is adapted to switch between cable access and radio access.

The user plane data transmission procedure in Pattern 2 in which the compression/decompression function is activated is as follows.

With reference to FIG. 46, the user plane data transmission and processing procedure on the uplink in the radio communication network is as follows.

The application layer data of the UE is encapsulated into IP packet or PPP packet and sent to the PDCP layer of the RNL. The PDCP layer compresses the headers of the data packet and sends the compressed data to the RLC/MAC of the RNL, the RLC/MAC layer receives and processes the data packet, adds RLC/MAC header into the data packet and sends the data packet to the WCDMA physical layer RFL. The physical layer codes and modulates the data packet and sends the data packet to the UTRAN via the Uu interface.

The WCDMA physical layer RFL of the Node B+WA element in the UTRAN receives the data packet and sends the data packet to the MAC/RLC layer of the RNL. The MAC/RLC layer removes the protocol headers of the data packet one by one, reorganizes and combines the data packet and sends the data packet to the PDCP of the RNL. The PDCP decompresses the compressed data packet headers.

The Node B+WA element performs the radio network layer and transport network layer procedures of the Iu interface and sends the data packet through the GTP tunnel to an element in the CN.

In the CN, the IGSN performs the transport network layer and radio network layer procedures of the Iu interface. The data received from the GTP tunnel are the UE IP packet or PPP packet. The IGSN sends the data in the format of IP packet or PPP packet to an external network. Alternatively, the SGSN performs the transport network layer and radio network layer processing of Iu interface, receives data from the GTP tunnel and sends the data to the GGSN via the GTP tunnel through the Gn interface. The data received by the GGSN from the GTP tunnel of the Gn interface are IP packet or PPP packet of the UE. The GGSN sends the data in the format of IP packet or PPP packet to an external network via the Gi interface.

Corresponding user plane data processing procedure on the downlink is similar to the procedure on the uplink. The difference is that the PDCP in the Node B+WA element compresses the data headers on the downlink and the PDCP in the UE decompresses the data headers on the downl ink.

In Pattern 2, the control plane signaling transmission and processing procedure of the radio communication network is based on the protocol stack structure shown in FIG. 47.

In Pattern 2, corresponding user plane data transmission of the optical network shown in FIG. 43 is similar to the procedures described above and is not described further.

III. Protocol Stacks in Pattern 3 and Corresponding Signal Transmission and Processing Procedure.

The differences between Pattern 3 and Pattern 1 include that: in Pattern 3, the WA equals the RNC plus the SGSN and the CN includes the GGSN which has the same functions as the IGSN in FIG. 43.

The protocol stack structures employed by the paths in Pattern 3 are the same as the protocol stack structures in Pattern 2, i.e., the path CPE->AF->ONU or ONT->OLT->CN employs the protocol stack structure shown in FIG. 43, and the path UE->Node B+WA->IGSN employs the protocol stack structures shown in FIGS. 46 and 48. The CN has the cable/radio access handover control function, i.e., includes a module adapted to switch between cable access and radio access.

The user plane data transmission procedure of the radio communication network in which the compression/decompression function is activated is described as follows. Corresponding user plane data transmission and processing procedure of the optical network is the same to the user plane data transmission and processing procedure of the optical network in Pattern 1 and will not be detailed herein.

With reference to FIG. 46, the user plane data transmission and processing procedure on the uplink in Pattern 3 is as follows.

The application layer data of the UE are encapsulated into IP packet or PPP packet and sent to the PDCP layer of the RNL. The PDCP layer compresses the headers of the data packet and sends the compressed data to the RLC/MAC of the RNL. The RLC/MAC layer receives and processes the data packet, adds RLC/MAC header into the data packet and sends the data packet to the WCDMA physical layer RFL. The physical layer codes and modulates the data packet and sends the data packet to the UTRAN via the Uu interface.

The WCDMA physical layer RFL of the Node B+WA element in the UTRAN receives the data packet and sends the data packet to the MAC/RLC layer of the RNL. The MAC/RLC layer removes the protocol headers of the data one by one, reorganizes and combines the data packet and sends the data packet to the PDCP of the RNL. The PDCP decompresses the compressed data packet headers. The Node B+WA element performs the radio network layer and transport network layer processing of the Gn interface and sends the data packet through the GTP tunnel to an element in the CN.

In the CN, because the SGSN is no longer included, the GGSN performs the transport network layer and radio network layer processing of the Gn interface. The data received from the GTP tunnel of the Gn interface are IP packet or PPP packet of the UE. The GGSN sends the data in the format of IP packet or PPP packet to an external network.

Corresponding user plane data processing procedure on the downlink of the radio communication network is similar to the procedure on the uplink. The difference is that the PDCP in the Node B+WA element compresses the data headers on the downlink while the PDCP in the UE decompresses the data headers on the downlink.

Corresponding control plane signaling transmission and processing procedure in Pattern 3 is on the basis of the protocol stack structure shown in FIG. 48.

IV. Protocol Stacks in Pattern 4 and Corresponding Signal Transmission and Processing Procedure.

In Pattern 4, the functions of the WA and the RGW are divided as shown in Table 1, the CN includes the SGSN and the GGSN; the SGSN and the GGSN may be integrated into a new element IGSN.

In Pattern 4, the transmission path of the radio communication network, i.e., UE->Node B->RNC->IGSN, employs the user plane protocol stack structures shown in FIGS. 49 and 50. Corresponding protocol stack structures on the control plane are shown in FIGS. 51 and 52. And corresponding transmission path of the optical network, i.e., CPE->AF-> ONU or ONT->OLT->CN, employs the protocol stack structure shown in FIG. 43. The RGW has the cable/radio access handover control function, i.e., includes a module adapted to switch between cable access and radio access.

The user plane data transmission procedure of the radio communication network in Pattern 4 in which the compression/decompression function is activated is as follows.

With reference to FIGS. 49 and 50, the user plane data transmission and processing procedure on the uplink is as follows.

The application layer data of the UE is encapsulated into IP packet or PPP packet and sent to the PDCP layer of the RNL. The PDCP layer compresses the headers of the data packet and sends the compressed data packet to the RLC/MAC of the RNL. The RLC/MAC layer receives and processes the data packet, adds RLC/MAC header into the data packet and sends the data packet to the WCDMA physical layer RFL. The physical layer codes and modulates the data packet and sends the data packet to the UTRAN via the Uu+ interface.

The WCDMA physical layer RFL of the BS+WA element in the UTRAN receives the data packet and sends the data to the MAC/RLC layer of the RNL. The MAC/RLC layer removes the protocol headers of the data packet one by one, reorganizes and combines the data packet and sends the data packet to the PDCP of the RNL. The PDCP decompresses the compressed data packet headers. The BS+WA element sends the decompressed data through the GTP tunnel via the Iub+ interface to the RGW. The RGW receives the data from the GTP tunnel at the Iub+ interface, performs the radio network layer and transport network layer processing of the Iu interface and sends the data packet to an element in the CN through the GTP tunnel.

The SGSN performs the transport network layer and radio network layer processing of Iu interface, receives data from the GTP tunnel and sends the data to the GGSN through the GTP tunnel via the Gn interface. The SGSN may be integrated in the RGW or set in the CN. The data packet received by the GGSN from the GTP tunnel of the Gn interface is IP packet or PPP packet of the UE. The GGSN sends the data in IP packet or PPP packet to an external network via the Gi interface.

Corresponding user plane data processing procedure on the downlink of the radio communication network is similar to the procedure on the uplink. The difference is that the PDCP in the BS+WA element compresses the data headers on the downlink and the PDCP in the UE decompresses the data headers on the downlink.

The control signaling transmission procedure on the control plane of the radio communication network is described hereinafter.

With reference to FIGS. 51 and 52, corresponding control signaling transmission and processing procedure on the uplink is as follows.

The RRC of the UE encapsulates the GMM/SM/SMS messages or signaling message of the layer into data packet and sends the data packet to the RLC/MAC of the RNL. The RLC/MAC layer receives and processes the data packet, adds RLC/MAC headers into the data packet and sends the data packet to the WCDML physical layer RFL. The physical layer codes and modulates the data packet and sends the data packet to the UTRAN via the Uu+ interface.

The WCDMA physical layer RFL of the BS+WA element in the UTRAN receives the data packet and sends the data packet to the MAC/RLC layer of the RNL. The MAC/RLC layer removes the protocol headers of the data packet one by one, reorganizes and combines the data packet and sends the data packet to the RRC layer of the RNL. The RRC layer usually parses the signaling message directly and performs corresponding actions, i.e., connection establishment, and check report. However, the RRC of the BS+WA element sends the signaling messages corresponding to relocation of the BS+WA element, multi-cell radio resource management, broadcast distribution, paging control and RANAP/RNSAP message forwarding to the RRC layer of the RGW over the Iub+ interface radio network layer (e.g., FP) and transport layer (e.g., IP/LNK/PHY). The RGW forwards the signaling messages to the CN for further processing.

Corresponding control signaling forwarding from the BS+WA element to the CN is as follows.

The BS+WA element divides the Iub+ interface FP/IP packet or NBAP/SCTP/IP packet into LNK frames and sends the LNK frames to the RGW over the physical layer between the BS+WA element and the RGW. The RGW performs the transport network layer and radio network layer processing of the Iub+ interface, retrieves the RNL frames of the RRC from the FP and sends the RNL frames to the MAC/RLC layer of the RNL. The MAC/RLC layer removes the packet headers one by one, reorganizes and combines the packet and sends the data packet to the RRC. The RRC layer decompresses the compressed data packet headers to retrieve the data packet, and sends the data packet to a network element in the CN after the radio network layer and the transport network layer of the Iu interface have processed the packet.

In the CN, the IGSN/SGSN performs the transport network layer and radio network layer processing of the Iu interface to retrieve the GMM/SM/SMS messages from the RANAP.

Corresponding control plane signaling transmission and processing procedure on the downlink in Pattern 4 includes: the UE receiving the signaling messages from the CN and RRC signaling messages from the AN on the opposite direction.

In the protocol stack processing model, the functions of the RRC layer are implemented by the RGW and the base station. The functions including fast connection establishment, fast feedback and resource allocation are provided by the base station and the functions such as data management, data storage and the processing related to multiple base stations are provided by the RGW.

To sum up, the various embodiments provide interconnection between a 3G/2G radio communication network and an OAN (e.g., PON access network) and an application scheme in which the radio communication network is tightly or loosely coupled with the OAN network after the radio interface protocol stack is moved down to the base station, therefore the radio communication network can function as the radio extension of the wireline access of the OAN and is suitable to fixed radio, nomad, portable and mobile access applications. In this way, the present disclosure provides a new evolution for OAN operators to develop radio networks.

The present disclosure moves the radio interface protocol stack down to the base station, offering the following merits to the interconnection communication system.

The standard Iu and Iur interfaces are reused as much as possible, so the interconnection system may evolve smoothly based on the conventional UTRAN architecture.

The air interface protocol stack is moved down, therefore the influence of the transmission lag time on the QoS is reduced and the QoS of high-speed data services is thus ensured.

The messages for configuring radio interface protocol user plane protocol by the radio interface protocol control plane RRC are processed within the BS, so the workload on the link between the BS and the BSC will be greatly reduced; and the transmission mechanism between the BS and the BSC is simplified to a great extent because the RLC re-transmission no longer uses the link between the BS and the BSC, therefore the data transmission performance and the utility ratio of the radio access network resources are improved significantly.

The multiple-to-multiple network structure effectively prevents failure caused the malfunctioning of a single point.

The interconnection communication system is suitable to fixed, nomad, portable and low-speed mobile radio access applications, and is easy to be merged with cable networks.

Furthermore, the tight coupling scheme provided by the present disclosure is based on the Wireless/Mobile over Fiber network, which compensates the disadvantages of the Wireless/Mobile access technique and OAN access technique and extend the network coverage. The Wireless/Mobile over Fiber complements the OAN coverage with wireless coverage, therefore, the 3G or 2G access network construction can make full use of the existing line resources of the original OAN network and the construction cost of the 3G or 2G access network is reduced.

The loose coupling scheme enables the radio network and the OAN to share the core network resources of the two networks, so the authentication, billing and customer care procedures can be performed in a unified manner and the network planning can be more appropriate.

The interconnection provided between the radio communication network and the optical network utilizes both the excellent mobility of the radio communication network and the good data transmission performance of the optical network, so that the communication network may provide between traffic transmission services for people.

The above description is only for exemplary embodiments. The protection scope, however, is not limited to the above description. Any alteration or substitution within the technical scope disclosed by the present disclosure and easily occurring to those skilled in the art should be covered in the protection scope. Therefore, the protection scope should be determined by the statements in Claims.

What is claimed is:

1. A system for interconnecting an optical network with a radio communication network, comprising:
   an optical access network (OAN) employing fibers for transmission; and
   a radio communication network connected to the optical access network, wherein
   a base station in the radio communication network is connected to an entity in the optical access network, and the base station communicates with the entity for interconnection between the optical network and the radio communication network; wherein the base station is connected to the entity via a Wireless Adaptor (WA), wherein the WA performs a part of the radio interface protocol functions in the Radio Network Layer (RNL) protocol stack.

2. The system of claim 1, wherein the WA is a function entity consisting of at least a part of function module taken from a Radio Network Controller (RNC) or a base station controller in the radio communication network.

3. The system of claim 2, wherein the WA further comprises a function of a Serving GPRS Support Node (SGSN), a mobile switch center or a packet control function in the radio communication network; and the WA communicates directly with a Gateway GPRS Support Node (GGSN) or a gateway mobile switch center or a Packet Data Serving Node (PDSN) in a Core network (CN) without the function of the SGSN or the mobile switch center or the packet control function.

4. The system of claim 2, wherein the at least a part of function module taken from a Radio Network Controller (RNC) or a Base Station Controller (BSC) in the radio communication network comprises one or more functions selected from the group consisting of functions of:
   Media Access Control (MAC), Radio Link Control (RLC), Packet Data Convergence Protocol (PDCP), Cell Specified Radio Resource Management (CS-RRM) and Handover (HO) Control; and
   optionally comprises one or more functions selected from the group consisting of functions of Broadcast / Multicast Control (BMC), Admission Control, Cell Control and QoS Allocation.

5. The system of claim 2, wherein function modules of the RNC or the BSC excluded the functions of the WA, form a Radio Gateway (RGW), and the RGW is coupled to the OAN as the entity in the OAN.

6. The system of claim 5, wherein the base station and the WA are integrated into a first network element, and a user plane of a first interface between the RNC and the SGSN in the radio communication network is employed as that of a second interface between the first element and the RGW, and a control plane of a third interface between the base station and the RNC in the radio communication network is employed as that of the second interface between the first element and the RGW.

7. The system of claim 5, wherein the RGW is coupled to the OAN via a reference point v and coupled to the CN via an Iu interface of the RGW at a reference point Iu, and the RGW is integrated with an optical line terminal of the OAN into a second network element.

8. The system of claim 5, wherein the RGW comprises a function of Broadcast Distribution and Relocation Control, and optionally comprises one or more functions selected from the group consisting of functions of Multi-Cell Radio Resource Management (MC-RRM), Paging Control, Handover Control between the Cable Access and the Radio Access, Multi-Cell Control, Radio Access Network Application Part (RANAP) Message Forwarding and Radio Network Subsystem Application Protocol (RNSAP) Message Forwarding.

9. The system of claim 2, further comprising: an adaptor function entity connecting the base station with the entity in the OAN, wherein
   the base station is connected directly to the adaptor function entity via a reference point T of the OAN, or is connected to the adaptor function entity by the WA via a reference point T of the OAN, and the adaptor function entity is connected to an Optical Network Unit (ONU) or Optical Network Terminal (ONT) in the OAN via a reference point (a) of the optical network;
   or,
   the adaptor function entity is integrated with the base station into a third element of the radio communication network and the third element is connected to the OAN via the reference point T; or the adaptor function entity, the base station and the WA are integrated into a fourth element of the radio communication network and the fourth element is connected to the OAN via the reference point (a).

10. The system of claim 2, wherein the base station and the WA are connected to form a fifth element and the fifth element is connected to the OAN via the reference point T, (a) or V of the OAN, and
   when the WA is connected to the OAN via the reference point V, the WA is also connected to the RGW and communicates with the CN via the RGW, the OAN is connected to the CN via the RGW and the fifth element consisting of the base station and the WA connections to the RGW by means of multiple-to-multiple; and
   when the WA is connected to the OAN via the reference point V, the CN or RGW connected to the WA and the OAN respectively includes a handover control function module for switching between cable access and radio access.

11. The system of claim 2, wherein the base station is connected to the WA and further to the ONU or ONT in the OAN via the WA in order to be connected to the OAN, and if the WA includes all functions of the RNC or the base station controller, the WA is connected to the CN via the OLT in the OAN.

12. The system of claim 11, wherein the base station, the WA and the ONU or ONT in the OAN are integrated into a sixth element of the radio communication network, and the element is connected to the optical distribution network of the OAN to connect to the OAN.

13. The system of claim 1, wherein
   the OAN and the radio communication network connect to a same Core Network (CN) through which services and management are provided for user terminals in the OAN and/or the radio communication network.

14. The system of claim 1, wherein the base station is connected to the ONU or ONT in the optical network and further to the RNC or the base station controller via the OLT in the OAN, and the base station and the ONU or ONT are integrated into a seventh element in the radio communication network to provide access service for user terminals in the radio communication network.

15. The system of claim 1, wherein the base station is directly connected to the reference point V in the OAN and further connected to a CN via the reference point V, and the OAN is connected to the CN via the reference point V and the CN includes an RNC or a base station controller.

16. A communication method for a system interconnecting an optical network with a radio communication network, comprising:

on an uplink, sending, by a user terminal in a radio communication network, a first message to a base station through a Wireless Adaptor (WA), forwarding the first message from the base station to an entity in an optical access network (OAN) and transmitting the first message in the OAN; transmitting a second message by a user terminal in the OAN, wherein the WA performs a part of the radio interface protocol functions in the Radio Network Layer (RNL) protocol stack;

on a downlink, sending, by the entity in the OAN, a third message to the base station through a Wireless Adaptor (WA) and forwarding the third message to the user terminal under the base station in the radio communication network; sending by a corresponding entity in the OAN, a fourth message to the user terminal in the OAN, wherein the WA performs a part of the radio interface protocol functions in the Radio Network Layer (RNL) protocol stack.

17. The communication method of claim 16, wherein the OAN communicates with a CN via an RGW connected to the OAN.

18. The communication method of claim 16, wherein the entity in the OAN connected to the WA, and the entity comprises one of:

an adaptor function entity, the ONU or ONT, or the optical distribution network.

19. A communication method for a system interconnecting an optical network and a radio communication network, comprising:

on an uplink, sending by a user terminal in the radio communication network a first message to a base station and forwarding by the base station the first message to a core network through a Wireless Adaptor (WA) in an optical access network (OAN); and sending by a user terminal in the OAN a second message to the core network through an entity in the optical access network;

on a downlink, sending a third message from the core network to the base station through a Wireless Adaptor (WA) and forwarding by the base station the third message to the user terminal under the base station in the radio communication network; and sending the second message to the user terminal in the optical network through the entity in the OAN.

20. The communication method of claim 19, wherein the OAN and the WA communicates with the core network via a radio gateway connected to the OAN and the WA.

* * * * *